(12) United States Patent
Dzierzanowski et al.

(10) Patent No.: US 12,223,469 B2
(45) Date of Patent: Feb. 11, 2025

(54) SYSTEMS AND METHODS FOR PROJECT ACCOUNTABILITY SERVICES

(71) Applicants: James M. Dzierzanowski, Gilbert, AZ (US); Agasthya P. Narendranathan, San Ramon, CA (US)

(72) Inventors: James M. Dzierzanowski, Gilbert, AZ (US); Agasthya P. Narendranathan, San Ramon, CA (US)

(73) Assignee: NEUROSYMBOLIC AI-IP, LLC, Gilbert, AZ (US)

( * ) Notice: Subject to any disclaimer, the term of this patent is extended or adjusted under 35 U.S.C. 154(b) by 130 days.

(21) Appl. No.: 17/471,944

(22) Filed: Sep. 10, 2021

(65) Prior Publication Data
US 2022/0237565 A1 Jul. 28, 2022

Related U.S. Application Data

(60) Provisional application No. 63/206,024, filed on Jan. 25, 2021.

(51) Int. Cl.
*G06Q 10/00* (2023.01)
*G06F 16/23* (2019.01)
(Continued)

(52) U.S. Cl.
CPC ....... *G06Q 10/103* (2013.01); *G06F 16/2365* (2019.01); *G06F 21/31* (2013.01);
(Continued)

(58) Field of Classification Search
CPC ............. G06Q 10/103; G06Q 10/0635; G06Q 10/101; G06Q 10/105; G06Q 30/018;
(Continued)

(56) References Cited

U.S. PATENT DOCUMENTS 10,127,378 B2 * 11/2018 Toth .................... H04W 12/126
10,250,583 B2    4/2019 Caldera et al.
(Continued)

FOREIGN PATENT DOCUMENTS

WO    2017222738    12/2017
WO    2018201009    11/2018
(Continued)

OTHER PUBLICATIONS

Yang, Hui, et al. "Analysing anaphoric ambiguity in natural language requirements." Requirements engineering 16 (2011): 163-189. (Year: 2011).*
(Continued)

*Primary Examiner* — Joseph M Waesco
(74) *Attorney, Agent, or Firm* — SNELL & WILMER L.L.P.

(57) ABSTRACT

A system for project accountability services comprises a processor and a tangible, non-transitory memory configured to communicate with the processor, the tangible, non-transitory memory having instructions stored thereon that, in response to execution by the processor, cause the processor to perform operations comprising receiving a user validation data, validation the user based on the user validation data to generate a validated user, receiving a request for service from the validated user, and providing, in response to the request for service, a project assessment and requirement accountability service comprising a knowledge catalog, an assessment process module, an accountability process module, an attestation process module, an evidence record, a project accountability schema, and a cryptographic key manager.

20 Claims, 22 Drawing Sheets

(51) Int. Cl.

| | |
|---|---|
| *G06F 21/31* | (2013.01) |
| *G06F 40/30* | (2020.01) |
| *G06Q 10/0635* | (2023.01) |
| *G06Q 10/0639* | (2023.01) |
| *G06Q 10/10* | (2023.01) |
| *G06Q 10/101* | (2023.01) |
| *G06Q 10/105* | (2023.01) |
| *G06Q 30/018* | (2023.01) |
| *H04L 9/08* | (2006.01) |
| *H04L 9/32* | (2006.01) |

(52) U.S. Cl.
CPC ......... *G06F 40/30* (2020.01); *G06Q 10/0635* (2013.01); *G06Q 10/06395* (2013.01); *G06Q 10/101* (2013.01); *G06Q 10/105* (2013.01); *G06Q 30/018* (2013.01); *H04L 9/0861* (2013.01); *H04L 9/3247* (2013.01)

(58) Field of Classification Search
CPC ............. G06Q 10/06395; G06Q 10/00; G06Q 10/02; G06Q 10/06; G06Q 10/10; G06Q 30/02; G06F 16/2365; G06F 40/30; G06F 21/31; H04L 9/0861; H04L 9/3247; G05B 2219/31357
See application file for complete search history.

(56) References Cited

U.S. PATENT DOCUMENTS

| | | | |
|---|---|---|---|
| 10,311,250 B2 | 6/2019 | Khi et al. | |
| 10,445,317 B2 | 10/2019 | Sanchez et al. | |
| 10,445,656 B2 | 10/2019 | Sanchez et al. | |
| 10,503,427 B2 | 12/2019 | Botes et al. | |
| 10,581,615 B2 | 3/2020 | Xie et al. | |
| 10,592,873 B2 | 3/2020 | Russinovich | |
| 10,614,239 B2 | 4/2020 | de Kadt et al. | |
| 10,621,164 B1* | 4/2020 | Kain | G06F 16/215 |
| 10,623,443 B2 | 4/2020 | Lang et al. | |
| 10,628,491 B2 | 4/2020 | Saxena et al. | |
| 10,719,766 B2 | 7/2020 | Lindsley | |
| 10,726,346 B2 | 7/2020 | Saxena et al. | |
| 10,756,906 B2* | 8/2020 | Toth | H04L 9/0894 |
| 2007/0276759 A1* | 11/2007 | Ginter | H04L 12/40104 705/53 |
| 2008/0162498 A1 | 7/2008 | Omoigui | |
| 2009/0327144 A1* | 12/2009 | Hatter | H04L 9/3231 340/5.82 |
| 2012/0290510 A1 | 11/2012 | Faddoul et al. | |
| 2016/0255082 A1* | 9/2016 | Rathod | G06Q 50/01 726/1 |
| 2016/0306984 A1 | 10/2016 | Amarendran et al. | |
| 2016/0371476 A1* | 12/2016 | Turgeman | G06F 3/04842 |
| 2017/0132636 A1 | 5/2017 | Caldera | |
| 2017/0270527 A1 | 9/2017 | Rampton | |
| 2018/0005186 A1 | 1/2018 | Hunn | |
| 2018/0094953 A1 | 4/2018 | Colson et al. | |
| 2018/0114159 A1* | 4/2018 | Dubey | G06F 15/16 |
| 2018/0129957 A1 | 5/2018 | Saxena et al. | |
| 2018/0285879 A1 | 10/2018 | Gadnis et al. | |
| 2018/0288073 A1 | 10/2018 | Hopper | |
| 2018/0307859 A1 | 10/2018 | LaFever et al. | |
| 2018/0322161 A1 | 11/2018 | Horii et al. | |
| 2018/0336286 A1 | 11/2018 | Shah | |
| 2019/0122149 A1 | 4/2019 | Caldera et al. | |
| 2019/0164241 A1 | 5/2019 | Bässler et al. | |
| 2019/0222567 A1 | 7/2019 | Caldera et al. | |
| 2019/0229914 A1 | 7/2019 | Patel et al. | |
| 2019/0281465 A1 | 9/2019 | Moshir et al. | |
| 2019/0312734 A1* | 10/2019 | Wentz | H04L 9/3239 |
| 2019/0387000 A1 | 12/2019 | Zavesky et al. | |
| 2020/0036515 A1 | 1/2020 | Chari et al. | |
| 2020/0084170 A1 | 3/2020 | Mutha et al. | |
| 2020/0143277 A1 | 5/2020 | Levine et al. | |
| 2021/0157903 A1* | 5/2021 | Bursell | H04L 9/3239 |
| 2021/0192651 A1* | 6/2021 | Groth | G06Q 30/0206 |
| 2021/0211472 A1* | 7/2021 | Murray | G06N 20/20 |
| 2021/0367963 A1* | 11/2021 | Murray | H04L 63/0414 |

FOREIGN PATENT DOCUMENTS

| | | |
|---|---|---|
| WO | 2019246568 | 12/2019 |
| WO | 2022159209 | 7/2022 |

OTHER PUBLICATIONS

International Search Report and Written Opinion dated Mar. 2, 2022 in Application No. PCT/US2021/063515.

Magagna, et al., "Data provenance and tracing for environmental sciences: system design", ENVRI, D8.5, A document of ENVRIplus project—www.envri.eu/envriplus, Work Package 8, Apr. 30, 2018, pp. 1-116.

H. Al-Khateeb et al., "Blockchain for Modern Digital Forensics: The Chain-of-Custody as a Distributed Ledger", WCRI, University of Wolverhampton, UK, Advanced Sciences and Technologies for Security Applications, https://doi.org/10.1007/978-3-030-11289-9_7, pp. 149-168.

Truong, et al., "GDPR-Compliant Personal Data Management: A Blockchain-based Solution", IEEE Transaction on Information Forensics and Security, arXiv:1904.03038v2 [cs.CR], Oct. 3, 2019, pp. 1-16.

IPO; International Preliminary Report on Patentability dated May 5, 2023 in Application No. PCT/US2021/063515.

* cited by examiner

SYSTEMS AND METHODS FOR PROJECT ACCOUNTABILITY SERVICES

CROSS REFERENCE TO RELATED APPLICATIONS

The present application claims priority to and benefit of U.S. Provisional Patent Application Ser. No. 63/206,024 entitled TRUSTWORTHY, IMMUTABLE AND LONG-TERM ARCHIVAL AND EVIDENCE PRESERVATION SERVICE, AND LEGAL REVIEW METHODS FOR DECISION SUPPORT AND AI/ML DESIGN DECISIONS AND ACCOUNTABILITY FOR MODELS, ATTRIBUTES AND DATA—IMPACTING ACCURACY, BIAS, DISCRIMINATION, TRUST, EQUITY, AUDIT, REGULATORY AND COMPLIANCE REQUIREMENTS filed Jan. 25, 2021, which is incorporated herein by reference for all purposes.

FIELD

The present disclosure generally relates to computer-based change control systems and, more particularly, to change control systems for enterprise class artificial intelligence and machine learning models.

BACKGROUND

The use of models based on Artificial Intelligence (AI) and Machine Learning (ML) techniques is becoming increasingly important for enterprises. Effectively capturing multiple domain- and sector-specific assessments, design decisions and establishing evidence grade accountability with immutability is desirable for monitoring, model management, model-based longitudinal studies, algorithmic audit, regulatory, compliance, risk management, reputational risk, financial, ethical, equity, discovery, legal actions, and societal impacts pertaining to AI/ML models.

SUMMARY

A system, method, and computer readable medium (collectively, the "system") is disclosed for project accountability services. In various embodiments, the system may comprise a processor and a tangible, non-transitory memory configured to communicate with the processor, the tangible, non-transitory memory having instructions stored thereon that, in response to execution by the processor, cause the processor to perform operations comprising receiving a user validation data, validation the user based on the user validation data to generate a validated user, receiving a request for service from the validated user, and providing, in response to the request for service, a project assessment and requirement accountability service comprising a knowledge catalog, an assessment process module, an accountability process module, an attestation process module, an evidence record, a project accountability schema, and a cryptographic key manager.

In various embodiments, the system may generate the knowledge catalog based on a plurality of documents. The system may apply a natural language processing algorithm to the knowledge catalog and form an Ontology Taxonomy with Symbolic Reasoning (OTSR) structure based on the output of the natural language processing algorithm. The system may associate the OTSR structure with the knowledge catalog and generate a graph database based on the knowledge catalog and the OTSR structure.

In various embodiments the system may apply an assessment process to the knowledge catalog. The system may derive the project accountability schema based on the assessment process and capture, via the assessment process module, a plurality of project specific requirements. The system may associate the project specific requirements with the project accountability schema and generate, via the accountability process module, a project accountability schema update.

In various embodiments, the system may verify a project member status. The system may calculate, via the cryptographic key manager, a digital signature including a private asymmetric key based on the project member status. The system may receive a request to preserve a project and initiate an attestation process. The system may generate a first evidence block and a second evidence block associated with the evidence record.

In various embodiments, the system may capture, via a project schema, a project member information comprising at least one of a name, a title, a role, an employee status, an organization, an email address, a phone number, a supervisor name, and a contribution. The system may capture, via the first evidence block, at least one of a design criterion, a development document, a design document, a development assumption, a risk assessment document, an optimization criteria, a model parameter, a decision support method, a model objective function, an influence and relevance diagram, or a first user defined custom field. The system may capture, via the second evidence block, at least one of a code base, a model snapshot, a production snapshot, a training data, a data associated with a quality assurance process, a test data, a data associated with a verification and validation process, a data availability, a data definition, or a second user defined custom field.

In various embodiments, the system may perform a Merkle root calculation of the project member information, the first evidence block, and the second evidence block. The system may call a secure timestamp agent to generate a secure timestamp. The system may have the secure timestamp with the project member information to generate a project member hash record. The system may sign the project member hash record with the private asymmetric key to generate an attested project member evidence record based on the Merkle root calculation.

In various embodiments, the system may recall a stored Merkle root calculation for the attested project member evidence record and compare the Merkle root calculation with the stored Merkle root calculation to determine a match. The system may combine a plurality of attested project member evidence records and sign the plurality of attested project member evidence records with a system key to generate the evidence record. The system may store the evidence record via an immutable database.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1A:
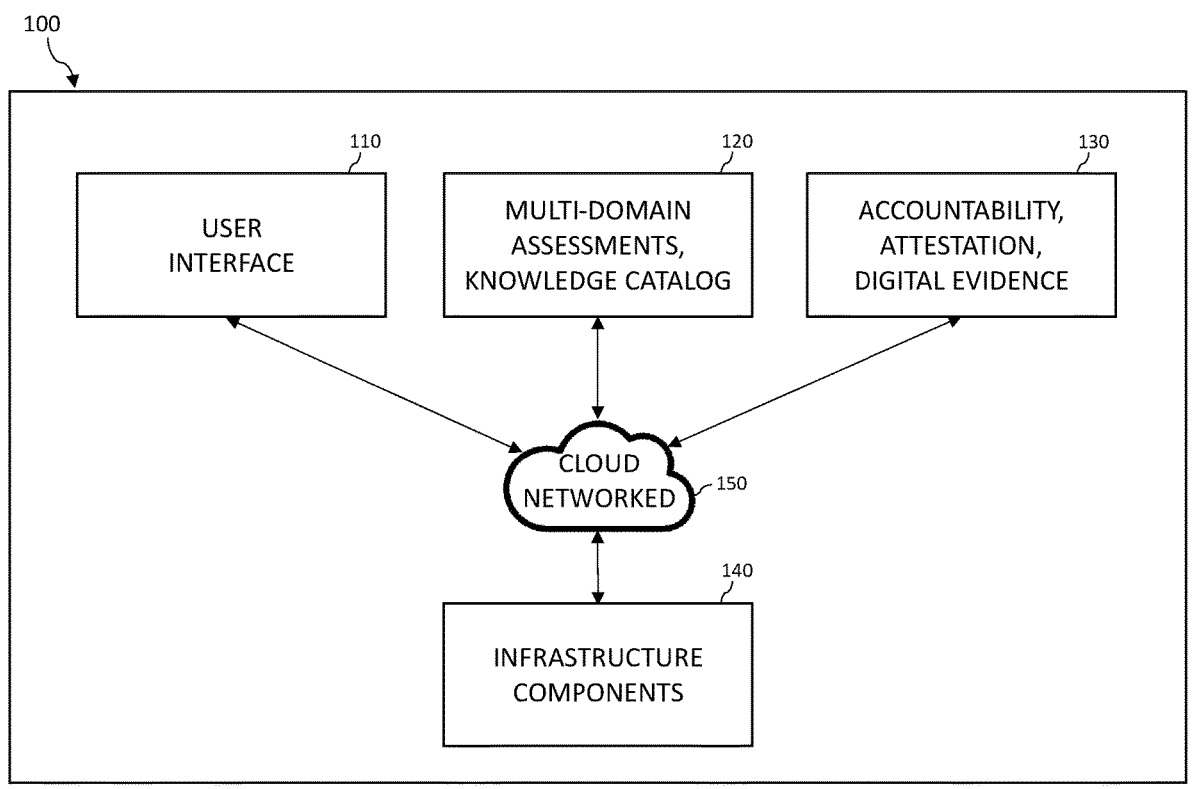
FIG. 1A illustrates a block diagram for a system for project accountability services, according to various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized, and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The system may provide a greater level of sophistication and/or control for project accountability and change control systems. The use of data and analytics is an increasingly important aspect of society, yet these outcomes must be designed and tested to operate within societal norms. Societal norms are defined within the context of the nation-state for which the system operates. For example, it is understood that the EU and Canada have stricter operating paradigms for privacy enforcement than the US. For example, existing project accountably and change control systems to be highly regimented semi-automated and/or manual processes. In this regard, customization of traditional change control processes to account for societal norms tends to be time consuming or inefficient with regard to computational and operational resources. While prior art systems tend to account only for technical change control, the current system includes multi-domain/sector assessments, frameworks, accountability, and methodologies which when combined comprise a trusted preservation service, discovery, and long-term evidence-preserving enterprise management system. Important to addressing model outcomes is accountability with ties to immutable data and code sources. Each of these analysis outcomes are captured in an immutable fashion and cryptographically enforced for legal, evidence audit, oversight, agency risk and risk management, governance and/or other review requirements.

In this regard, the system has the capability to cross many sectors, such as financial services, healthcare, consumer, eCommerce, payments, risk management, and government (civilian, military, and other levels of secrecy classifications), yet is unlimited in terms of application domains, as AI/ML models have unbounded levels of applicability to problem spaces. In addition, the system substantiates the decision support capabilities in manual, augmented or fully automated implementation scenarios.

As such, the system may eliminate or reduce record manipulation, improve record reliability, along with enabling enhanced automation features. In this regard, the system may also reduce the cost of development or system processing time for project accountability, change control and model auditing, reduce network utilization, and/or reduce data storage overhead. The system may increase data reliability or accuracy by enabling data filtering functions and reliability testing.

This process improves the functioning and developer utilization of the computer. In various embodiments, the computer demonstrates the effective establishment and use of project development guardrails and accountability, ensuring the final application under development operates within appropriate societal, legal, regulatory, and entity policy requirements. When performed appropriately during development, quality outcomes are enhanced, and application rework and potential legal and brand damage is reduced as measured by the user entity. Computationally expensive utilization of the computer may be performed by and distributed to the appropriate component of the computer, such as cryptographic security operations by secure hardware modules, and immutable storage on a cloud platform.

The system may approach address deployment challenges, including but not limited to US domestic and international legislative, legal, data privacy, regulatory and compliance requirements, risk frameworks, algorithmic audit, including privacy, cybersecurity, societal/social considerations, and the like. The system may include a record of data engineering decisions, data usage and archival purposes, retrieval with integrity assurance, re-usable executable components, investigation, audit, legal interrogatives, litigation, and defense support, reporting, research, model analytical analysis, and longitudinal model effectiveness studies (i.e., bias and drift analysis).

In various embodiments, the system may enable the capture of decision support and model design accountability against the requirements that may be examined during legal proceedings, audits, reviews, algorithmic, social and data impact assessments. The system may enable algorithmic accountability and social impact analysis in the areas of bias, equity, transparency, and fairness, capturing these critical aspects in an immutable fashion. The system may provide data provenance used for development, verification, validation, and quality assurance processes. The system may capture, in an immutable fashion for subsequent analysis, model risk management requirements appropriate for the users's domain and function. In this regard, the system may generate an immutable digital evidence chain of custody based on the captured information. In various embodiments, the immutable digital evidence chain of custody may be enabled by Distributed Ledger Technology (DLT).

While in practice the term "blockchain" may hold a variety of contextually derived meanings. It is to be understood, the term DLT, in lieu of 'blockchain", as used herein, refers to a concatenation of sequentially dependent data elements acting as a data ledger that stores records relating to a decentralized computing system. For those skilled in the art, it is understood that the technical capability of immutable storage, includes capabilities demonstrated by Distributed Ledger Technology.

In various embodiments and without limitation, a DLT infrastructure may be used for the immutable storage and tracking of critical aspects and accountability of model development. With its modular approach, the DLT component of the system is permissioned, in which operation is amongst known participants in model development, based upon the end entities authorization and authentication mechanisms, thereby forming an initial stake of accountability. With the identities of the participants established via entity user policy, management definition of roles and responsibilities, consensus protocols associated with permissions do not require costly mining.

In supporting the evolving technology platforms and the developing model management environments, Cybersecurity controls, such as but not limited to vulnerability and software patch management, perimeter defense, malware countermeasures, business continuity, secure application development methods (NIST 800-53, ISO 27001 and SANS Critical Security Controls) are targeted to these emergent specialized application, data, communication, and platform requirements. In various embodiments of modern and emergent technological methods, associated Cybersecurity controls are embedded encompassing quantum resistant cryptography methods; cryptographic key management; Distributed Ledger Technology; cloud computing; Artificial Intelligence and Machine Learning techniques.

In various embodiments, the system may include system platforms, Cybersecurity controls, cryptographic devices and interfaces that are compliant with all or part of standards by the Institute of Electrical and Electronic Engineers (IEEE), Hyperledger Consortium under the Linux Foundation, International Telecommunications Union-Telecommunications Standardization Sector (ITU), European Telecommunications Institute (ETSI), Internet Engineering Task Force (IETF), U.S. National Institute of Security Technology (NIST) and American National Standard Institute (ANSI).

In various embodiments, fundamental ontologies of abstract and concrete concepts embodied in AI/ML and decision systems are organized and structured by the system via a junction of upper/meta-level, domain, interface and process software constructs with industry, compliance, and regulatory specific classification-based taxonomies. Software architecture and constructs combine multi-dimensional knowledge graphs, immutable storage, symbolic knowledge and information representations, data structures and types, databases, algorithmic (models, parameters, and values), object-oriented and inheritance constructs, constraint satisfaction, semantic web, cryptography, robotic process automation, inference, case-based reasoning, pattern matching, and forward/backward chaining rules—capturing ontologies, taxonomy representations over which analysis, pattern matching, explanation, inference and/or reasoning is executed. The system may capture this layered multi-functional analysis in an Ontology and Taxonomy based Symbolic Reasoning (OTSR) technology architecture. The OTSR architecture supports inclusion of environmental, climate, justice, and/or other domain-specific frameworks as developed by users, and/or others. Ultimately, the user is responsible for their conformity assessment, documentation and monitoring processes, including those necessary for extraterritorial services and products.

In various embodiments, the lower interfaces, process, and domain taxonomies (i.e., financial, healthcare, environmental, government civilian/military/classified) of Algorithmic Impact Assessments (AIA), Societal Impact Assessments (SIA), Model Risk Management (MRM), Privacy Impact Assessments (PIA), legal and regulatory frameworks sourced globally are generated by the system for the particular entity (e.g., financial services, healthcare, consumer, eCommerce, payments, government etc.). Specific examples may include the EU Artificial Intelligence Act, US Government and State level legislation, FTC, FDA regulations, and privacy related assessments. For example, Article 22 of the General Data Protection Regulation (GDPR) and the European Data Protection Board (EDPB) have established conditions and guidance in relation to AI/ML systems that make decisions and are codified.

In this regard, the system identifies to the user what aspects of the taxonomy are based on law and regulation, which aspects are not legal or instituted from a regulatory perspective, and which aspects are provided merely as guidance. Guidance may include, for example, industry best practices, pending law and regulation and/or directional statements from varied institutions.

In various embodiments, the machine-readable symbolic tokens, text and project-specific information, entity ethical principles, policy, and guidance, combined by Natural Language Processing (NLP) techniques via software traverses the graphic structure, constructing explanation and audit trails for meaningful human oversight. The system supports API queries to the graphic structure and NLP outcomes for reporting and review processes.

The system provides a graph-based structure combined with multiple data types of symbolic, tokens, numeric, strings—codified to form the ability to infer, pattern-match via the Rete-NT algorithm (FORGY 1982, a pattern matching algorithm based on directed acyclic graphs for implementing rule-based systems), reason symbolically with NLP output as human understandable explanation and auditable/legal forms describing the interconnected relationships and outcomes. Frameworks are codified based on the analysis, and intent of the authors, whereby each node may be represented as a symbolic token, sub-symbolic exemplifications, and human understandable text, when combined in whole or in part, to supply model-specific and policy/regulatory context to the node, and overall explanation.

In various embodiments, the system comprises an editor module configured to enable user entity generated industry frameworks. Industry frameworks may be editable and new frameworks may be added via system supplied industry frameworks and/or imported from available predefined or user-generated frameworks. In this regard, user entity self-regulation processes and procedures are enabled for capture and tracking via entity-generated frameworks by the editor software module capabilities.

In various embodiments, an entity project team may control the initiation of the preservation service process and may tie the process invocation to agile sprints, waterfall, project milestones, key decision points or release cycles. Fundamentally, three phases of preservation are included, however additional preservation opportunities may be supported, and at the entity's discretion. The three basic phases are project checkpoints and human review by entities as they serve as a basis of accountability and auditability, including project initiation, production launch and post-production monitoring, such as but not limited to additional reviews as required.

In various embodiments, versions, and version control of frameworks, policies, legal and regulatory requirements, and/or associated materials are systematically captured and maintained. The evidence preservation component of the system may be configured to interface with a plurality of existing data sources including, for example, Apache Spark, Hadoop, Kafka, Amazon Redshift, Azure SQL, Microsoft SQL Server, Teradata, DICOM, image sources, data warehouses, and the like. The evidence preservation component may be based on an underlying DLT which may be a permissioned system. The DLT enables storage of immutable digital evidence and establishing a chain of custody, however, as these mechanics are embedded within the system, they are thereby transparent to the entity.

In various embodiments, sub-system design for a forensic Digital Chain of Evidence (DCoE) focused on capturing critical elements that maintain the integrity and authenticity of all necessary business and technical aspects influencing design and implementation of decision support models. These many considerations enable digital data and information to become evidence in internal or external reviews, audits, compliance examinations, regulatory analysis, and admissibility in legal actions.

It will be understood that a full range of data, models, design actions, parameters, attributes, documentation, and all associated project related information becomes digital evidence once the appropriate and necessary controls are performed as enabled by the system.

In this regard, the system enables digital evidence which is auditable and authentic, demonstrating integrity, accuracy, and completion. For digital evidence to be trusted, it must include technical principals of security, transparency, guaranteed tamper resistance, virtually eliminating the ability of data/information removal, or unauthorized changes, or changes outside of system integrity methods, documentation properly maintained and preserved over the project lifecycle, corruption prevention by untrusted parties, explainable and managed over time with lifecycle elements, and independent of machine implementation characteristics.

For example, during operations, only authorized participants may be allowed by the system to create project instances as the basis of evidence, display, store, review, attest, report, and export and/or transfer of digital evidence. While transparent to participants and entities, a DLT-based solution establishes a digital forensic chain of custody methodology, or Forensic-Chain. Foundationally, the Forensic-Chain is an immutable and cryptographically secure distributed ledger.

Thus, a Forensic-Chain DLT-based sub-system as a component of the system enables a digital evidence chain of custody, providing the benefits of trusted audit trails by maintaining and enforcing integrity, transparency, authenticity, security, tamper resistance, and auditability of digital evidence, and associated operational procedures as defined by policy and system operator. The system thereby provides forensically sound characteristics of digital evidence integrity, design reconstruction, evaluation for a legal context, and repeatable analytic processes.

For a given project instance, and all associated and necessary information, this knowledge may be captured and codified as a Digital Evidence Bag (DEBs) within a Digital Evidence Cabinet (DEC), and then stored chronologically on the Forensic-Chain. Timestamps for chronological determination are highly accurate with integrity. Programmatically, the Forensic-Chain may be accessible via an API provided by the system such as, for example over HTTP via a RESTful API.

In various embodiments, a Forensic-Chain used for digital chain of custody and digital evidence administration as immutable data may be a Docker and/or Linux LxC container. Mutable data captures and records the interaction with the digital evidence. These logs are timestamped and cryptographically signed by the system attestation method. Management of containers provides virtualization, container deployment, scaling, and clustering.

Methods desirable for evidentiary-level digital data include reliable high integrity timestamps. Timestamps associated by the system with lists of hashed Evidence Record values, allow for verification of the creation and/or existence of these data objects at a unique time. In various embodiments, timestamps may be cryptographically coupled with the Evidence Record structures by the system via quantum-safe digital signatures. In various embodiments, the system may communicate with a timestamp source to acquire a timestamp. For example, RFC3161 specifies a structure for timestamps [ETSI 319 121-1 i.5], and a protocol for communicating with a timestamp source and has been adapted for modern sourcing methods via APIs. A timestamp token may be expressed as UTC time (Coordinated Universal Time) to eliminate local time zone issues. Accuracy is expressed in milliseconds, with encoding terminated by a "Z", meaning Zulu time. A timestamp establishes when a specific transaction or method occurs or is invoked and serves as a key data point in the process.

In various embodiments, the system may perform Merkle Root calculations. The calculation of a Merkle Root [Merkle83] concisely proves the validity of data being part of a dataset without storing the whole data set, while utilizing one-way hashing techniques. The outputs or messages from one-way hashes [SHA3-512] are intended to be collision free and deterministic, post-quantum-resistant [NISTR 8309], non-reversable, with many orders of magnitude smaller that the input message, and with no output plaintext hashes being the same from different inputs.

In various embodiments, an output message of a Merkle Tree root calculation [RFC 6234 (digestAlgorithm) and RFC 4998] combined with efficient and secure timestamping, may be used to establish a means of long-term preservation of evidence [ETSI TS 119 512]. In this regard, cryptographic methods prove the existence and integrity of project code libraries, documentation, policy, and many forms of data, including digitally signed records, in a common and reproducible means, maintaining validity over a long and possibly undetermined time. The output message may be a structure designed to support long-term nonrepudiation of the existence, and without altercation or modification of information, thereby becoming digital evidence.

In various embodiments, a Merkle tree may be used to generate a message at the tree root level, ensuring integrity and validity of a project library and data, in response to an attestation challenge by a calling service. In some embodiments, the calling service on the behalf of a specific project member, generates a digital signature over the root level output message using the project member's cryptographic key [RFC 8391 (eXtended Merkle Signature Scheme)]. As part of providing a solution to the service request, the project member will obtain a signing key pair, generated with appropriate security hygiene methods enabled by the system.

In various embodiments and with reference to FIG. 1A, a system 100 for project accountability services is illustrated as a block diagram of functional modules. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing. System 100 includes a user interface module 110, a multi-domain assessments and knowledge catalog module 120, an accountability, attestation, and digital evidence module 130, infrastructure components 140, and a secured cloud network 150.

System 100 may be computer based, and may comprise a processor, a tangible non-transitory computer-readable memory, and/or a network interface, along with other suitable system software and hardware components. Instructions stored on the tangible non-transitory memory may allow system 100 to perform various functions, as described herein. In various embodiments, cloud network 150 may be configured as a central network element or hub to access various systems, engines, and components of system 100. Cloud network 150 may comprise a network, computer-based system, and/or software components configured to provide an access point to various systems, engines, and components of system 100. Cloud network 150 may be in operative and/or electronic communication with the modules 110, 120, 130, and infrastructure components 140.

Via user interface module 110, the users of the system may interact with various functional modules of the system 100. In various embodiments, the workflow of system 100 may include and be orchestrated across various computing devices via the user interface module 110. The system may perform pre and postproduction conformity assessments across multiple knowledge domains, sectors, and regulatory environments via module 120. The system may capture design accountability by business owners, management, and development teams, and execute attestation via rigorous cryptographic processes and optional hardware cryptographic devices as enabled by module 130. In various embodiments, system 100 infrastructure components 140 may include, for example, immutable storage, reporting, analytic tools, time sources, and or the like.

In one or more embodiments, the system may facilitate access and versioning of remote sourced data, on-prem, local data sources, and meta-data assets, including data Access Control Lists (ACLs). The system data provenance feature addresses the prevalence and danger of data cascades, whereby data gathering, and collection upstream may have serious consequences downstream (during model development, production, and inference). In addition, data cascades may occur because of data source brittleness and model drift.

In various embodiments, cloud network 150 may comprise a highly networked scalable Software as a Service (SaaS) cloud platform solution. For example, Microsoft Azure may be implemented, given its support for DLT (Hyperledger Fabric and Composer), cryptographic key management capability (key vault and hardware security modules), assured by its compliance with Federal Information Processing Standard (FIPS), and secure cloud container capabilities. In various embodiments, the application can be deployed on-premises, provided by a SaaS service provider, cloud provider, and/or any combination thereof. System design methods do not use ASN.1 syntax, as many earlier standards utilized. System methods include modem implementation techniques based on JSON and REST. However, the present invention is not limited to these embodiments, as other embodiments can be used to practice this invention.

As used herein, the term "network" includes any cloud, cloud computing systems or electronic communication system or method that incorporates hardware and/or software components. Communication among the parties may be accomplished through any suitable communication channels, such as, for example, Internet, Quantum Internet, satellite, or wireless communications. Moreover, although the system is frequently described herein as being implemented with TCP/IP communications protocols, the system may also be implemented using any tunneling protocol (e.g., IPsec, SSH), or any number of existing or future protocols.

Figure 1B:
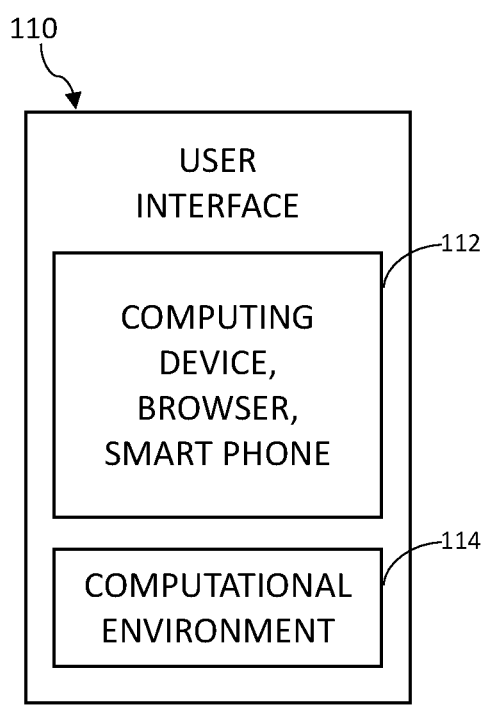
FIG. 1B illustrates a user interface module of the system, according to various embodiments.

With additional reference to FIG. 1B, user interface module 110 comprises a user interface, which may include various computing devices configured to communicate via cloud network 150. In various embodiments, module 110 comprises a computing device 112 and/or a computational environment 114 which may take the form of a computer or processor, or a set of computers/processors, although other types of computing units may be used. Exemplary computing devices and supporting user interfaces include browsers, servers, clustered and/or pooled servers, laptops, notebooks, handheld computers, personal digital assistants, cellular phones, smart phones, or any other device capable of receiving data over networks.

In various embodiments, the computational environment 114 may include multiple commercial and open-source technical tools, computer programming languages, code libraries, collaboration techniques, including fundamental source code management technologies, AI/ML development languages and environments (i.e., computational notebooks for model development and data science purposes), ML model specification standards (PMML), cloud-based containers, cybersecurity controls and data privacy techniques, forming a systematic development view defined as AIMODELOPS.

Computational environment 114 may incorporate computational notebooks and or browsers as a key element of a computation environment that provides the ability to capture a computational narrative (supplement developer code and data with analysis, algorithmic transparency, hypothesis, requirements, and compliance/regulatory chronicles). System features may include reproducibility, documentation, versioning, and provenance (code, parameters, and data) that enables developers with collaborative functionality, observability and visualization, workflow, providing reactivity (development, testing, code changes and data modifications), performing peer/audit reviews for accountability and compliance purposes.

In various embodiments, the computational environment 114 integrates with opensource ML-oriented explanation techniques understood by those skilled in the art, such as Global Attribution Mapping (GAM), Shapley Additive Explanations (SHAP), Locally Interpretable Model-Agnostic Explanations (LIME), Score-Weighted Visual Explanations for Convolution Neural Network (CNN), Class Activation Map (Score-CAM), and/or others—as developers select the appropriate method depending upon model type requirements. The computational environment 114 may support various languages such as, for example, Python, R, Julia, and/or the like. Software elements and plug-ins of the system 100 may also be implemented using Jupyter Notebooks', JupyterHub, Observable Data, Vizier, nbdime, and Neo4j, and/or any other suitable and/or desired tools/modules/libraries.

Figure 1C:
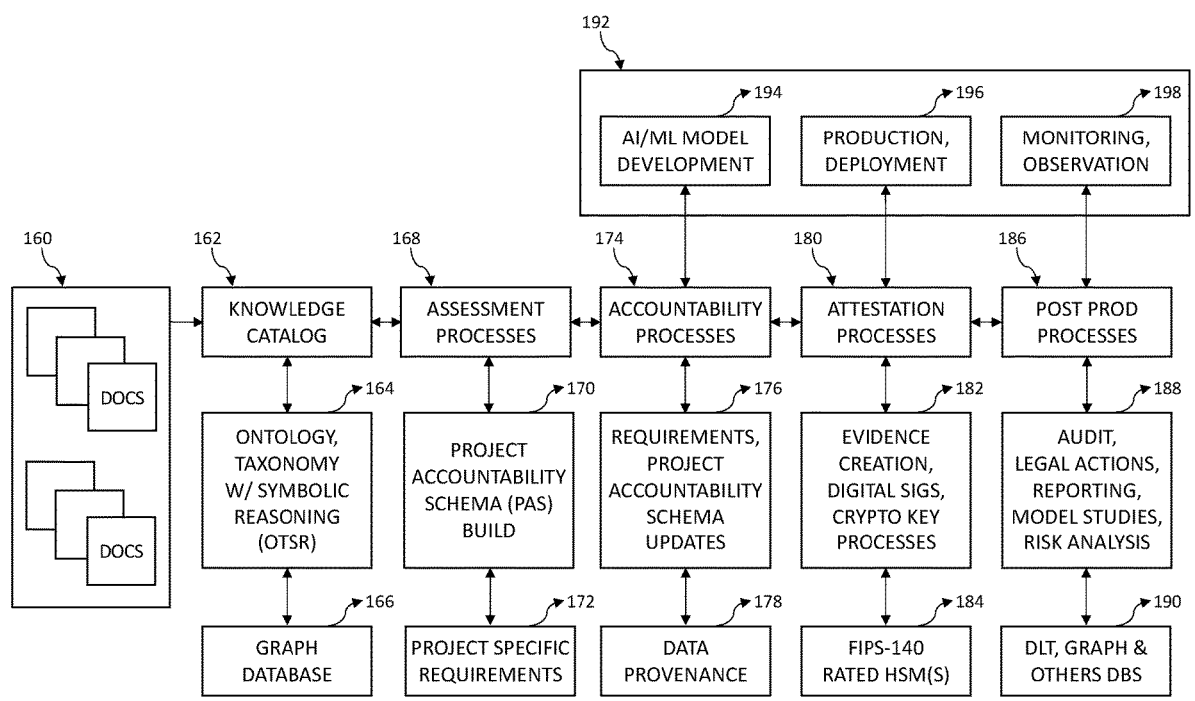
FIG. 1C illustrates a block diagram of the integrated process modules and end-to-end system processes in a system for project accountability services, according to various embodiments.

In various embodiments and with additional reference to FIG. 1C, a block diagram of the integrated process modules and end-to-end system processes of system 100 is illustrated. Documents process 160 represents documents that are exemplars of knowledge, information, and data sources of many types. For example, documents 160 may originate from many forms, such as but not limited to multi-domain, multi-national and multi-sector documents, standards, guidance, industry best practices, regulatory and legislative sources. Documents 160 may include, for example, codes of law, industrial standards, contract requirements, testing requirements, engineering specifications, and/or the like. It is expected by those skilled in the art, that they understand knowledge management including specialized areas of medicine and or other domains, is driven by language, logic, and conceptual ontology and taxonomy-based relationships. Documents 160 are ingested by the system and serve as inputs to the generation of a knowledge catalog 162.

Knowledge catalog 162 module forms the basis of system 100 knowledge from which project specific assessments are developed against, forming the basis of AI/ML project development and accountability requirements. Software processes and tools of the knowledge catalog 162, transform knowledge from documents 160, into evolving executable system structures, thereby generating the knowledge catalog 160. With the use of software tools, such as Stanford NLP, scikit-learn, LexNLP and the like, these tools systematically process knowledge into executable constructs, forming an Ontology, Taxonomy with Symbolic Reasoning (OTSR) 164 structure. In various embodiments, OTSR structure is implemented via a graph database 166 as further illustrated in FIGS. 2A, 2B, 2C and 2D. In this regard, the system generates the knowledge catalog based on the plurality of documents 160. The system may apply a natural language processing algorithm to the knowledge catalog to form the OTSR structure based on the output of the natural language processing algorithm. The system may associate the OTSR structure with the knowledge catalog and generate the graph database based on the knowledge catalog and the OTSR structure.

The knowledge catalog 162, and its underlying OTSR structure 164 and associated Graph Database 166, serves as an input to the assessment process 168 module. As an entity's project team performs the multi-domain, multi-national and multi-section assessment process via the assessment process 168 module, thereby determining appropriately selected and required by the entity's governance and compliance criteria, the assessment results obtained by the assessment process 168 module systematically derive an internal systematic structure, i.e., a project accountability schema 170. The assessment process module is configured to capture project specific requirements 172 for project documentation. The assessment process 168 module thereby derives a set of development requirements based on the multiple documentation sources 160 for evaluation by the entity's project team. In this regard, the system applies via the assessment process module, an assessment process to the knowledge catalog. The system derives the project accountability schema 170 based on the assessment process. The system captures, via the assessment process 168 module, a plurality of project specific requirements 172 and associates the project specific requirements 172 with the project accountability schema 170. The output of the assessment process 168 module serves as input to the accountability processes 174 module. The interactive process with the entity's project team in which the PAS 170 is built from the knowledge catalog, is further illustrated, and represented in detail in FIG. 2E.

Continuing with FIG. 1C, accountability processes 174 module, systematically tracks the progress by the entity's development team against requirements captured by assessment process 168 module. Accountability process 174 module is configured to provide project accountability schema updates 176 as they may occur during development. The Accountability process 174 module enables tracking of development progress and captures/tracks data provenance 178 which may be used during development, testing, and verification/validation of the AI/ML models. In this regard, accountability process 174 module ties assessment requirements to code development outcomes. Accountability process 174 module may systematically tag and link sections of code to specific requirements (e.g., of project accountability schema 170).

The links and tags may be generated by the accountability process 174 module in response to a user input indicating completion or an association between the code and the requirements. In response, the accountability process module may generate the project accountability schema updates 176. In this regard, the project accountability schema 170 is updated systematically by the accountability process 174 module, and updates include subsequent changes and edits to sections of code, if performed. The data provenance process 178 captures data for differing phases of development thereby establishing data history, minimization, provenance and obfuscation, and memorializing data available to the team at the time of development. Knowing what data was available to the development team, or not, at the time of development, may tend to assist downstream AI/ML audits.

Figure 2A:
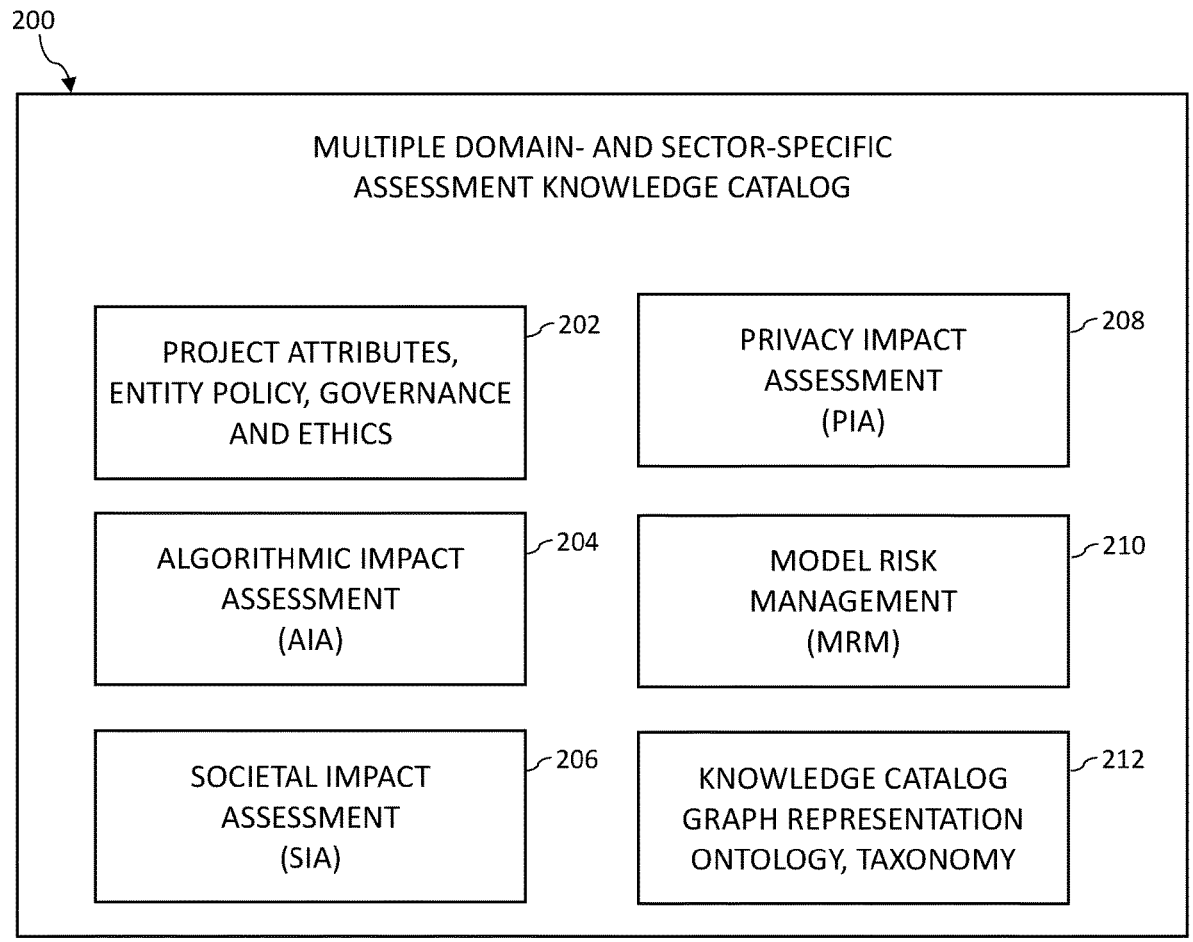
FIG. 2A illustrates a hierarchical representation of a knowledge catalog, including multi-domain sub-assessment types, in accordance with various embodiments.
Figure 2B:
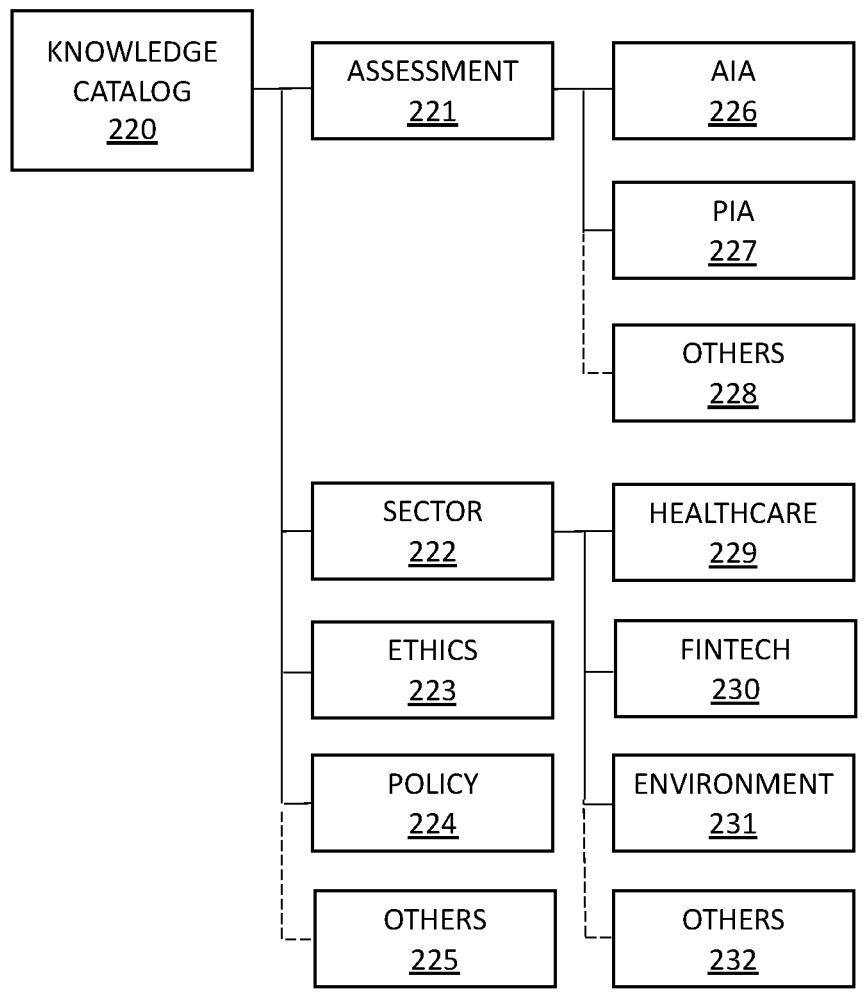
FIG. 2B illustrates a hierarchical representation of a knowledge catalog, in accordance with various embodiments.
Figure 2C:
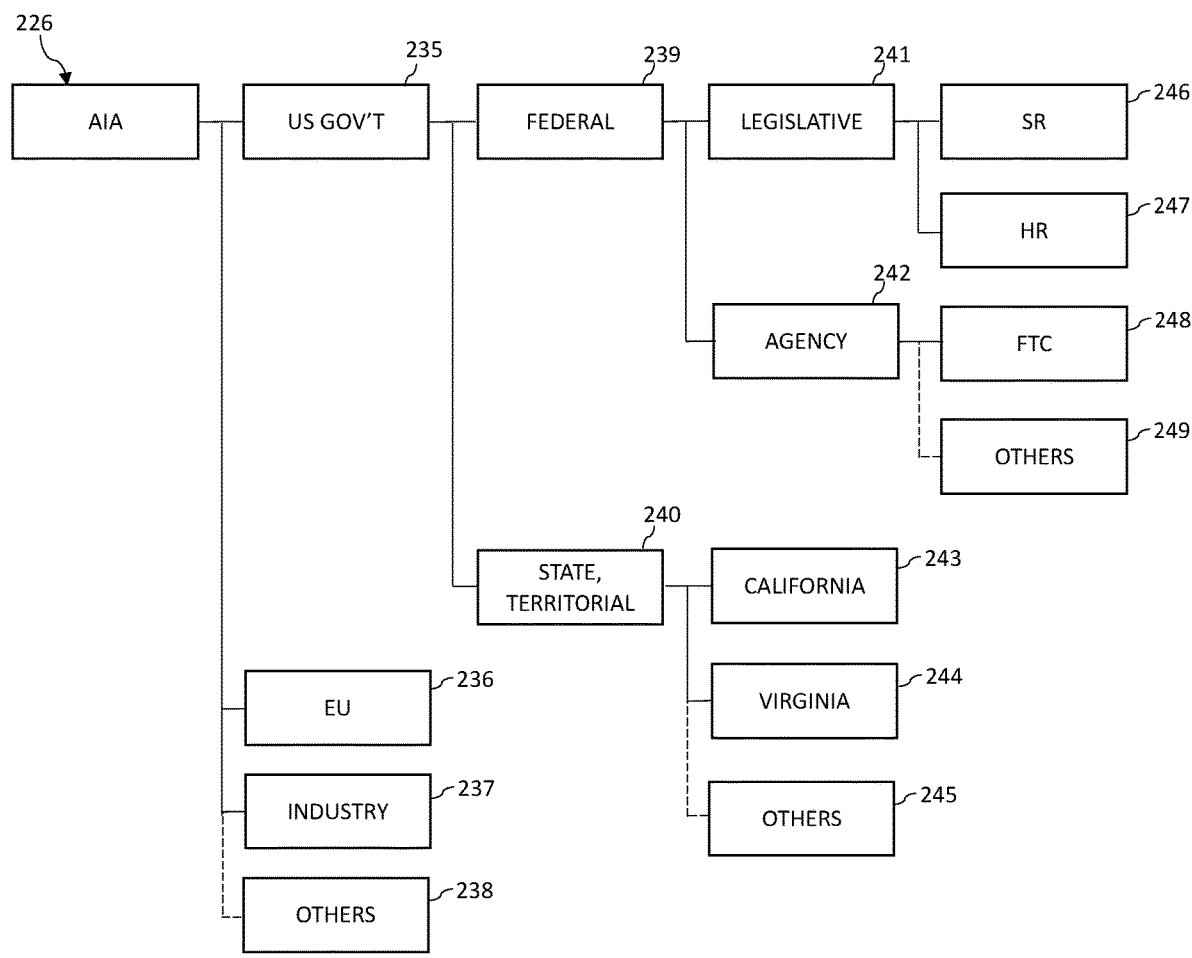
FIG. 2C illustrates a block diagram illustration of an Algorithmic Impact Assessment (AIA) and associated graph hierarchy, in accordance with various embodiments.
Figure 2D:
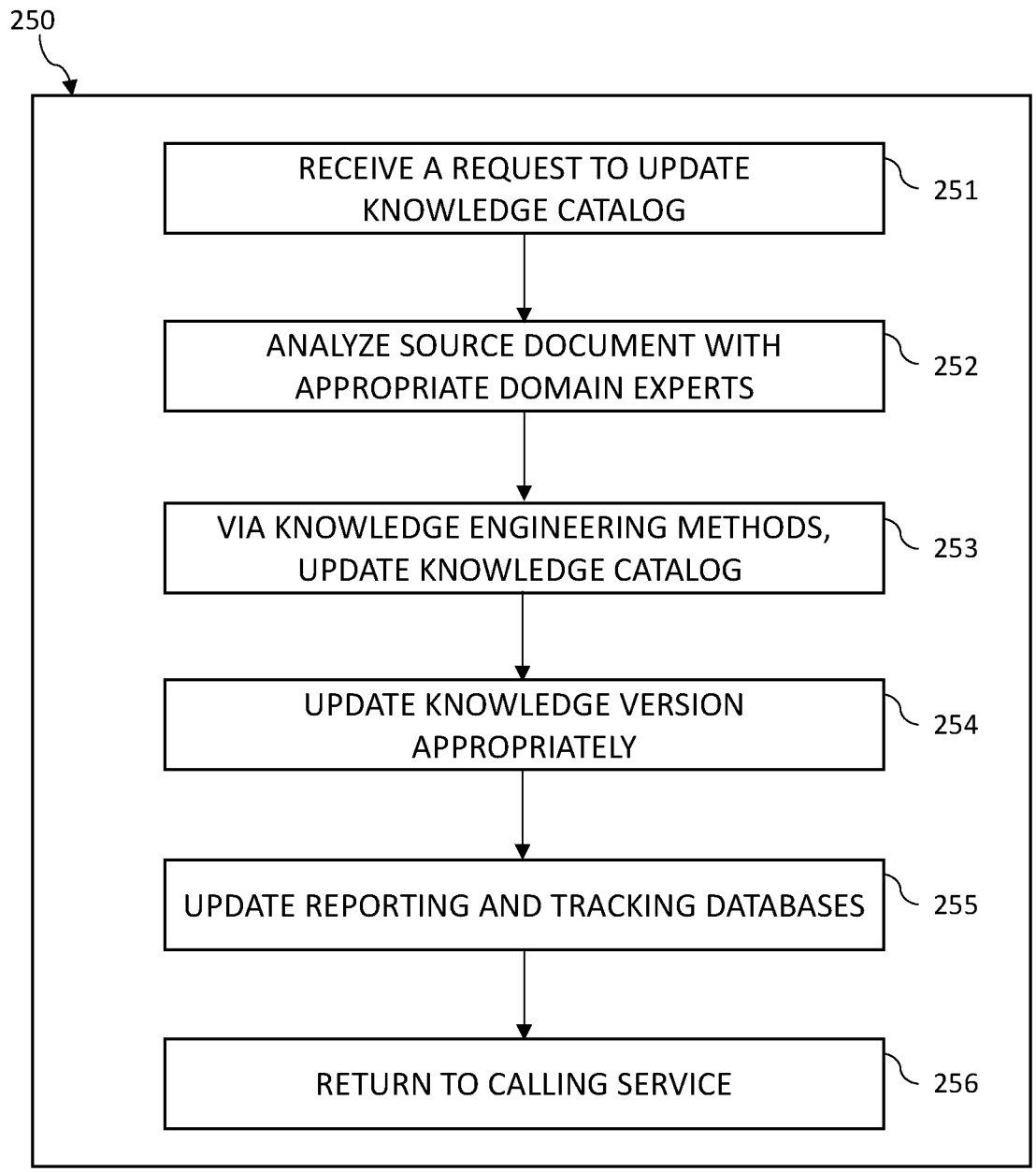
FIG. 2D illustrates a process flow for updating a knowledge catalog, in accordance with various embodiments.
Figure 2E:
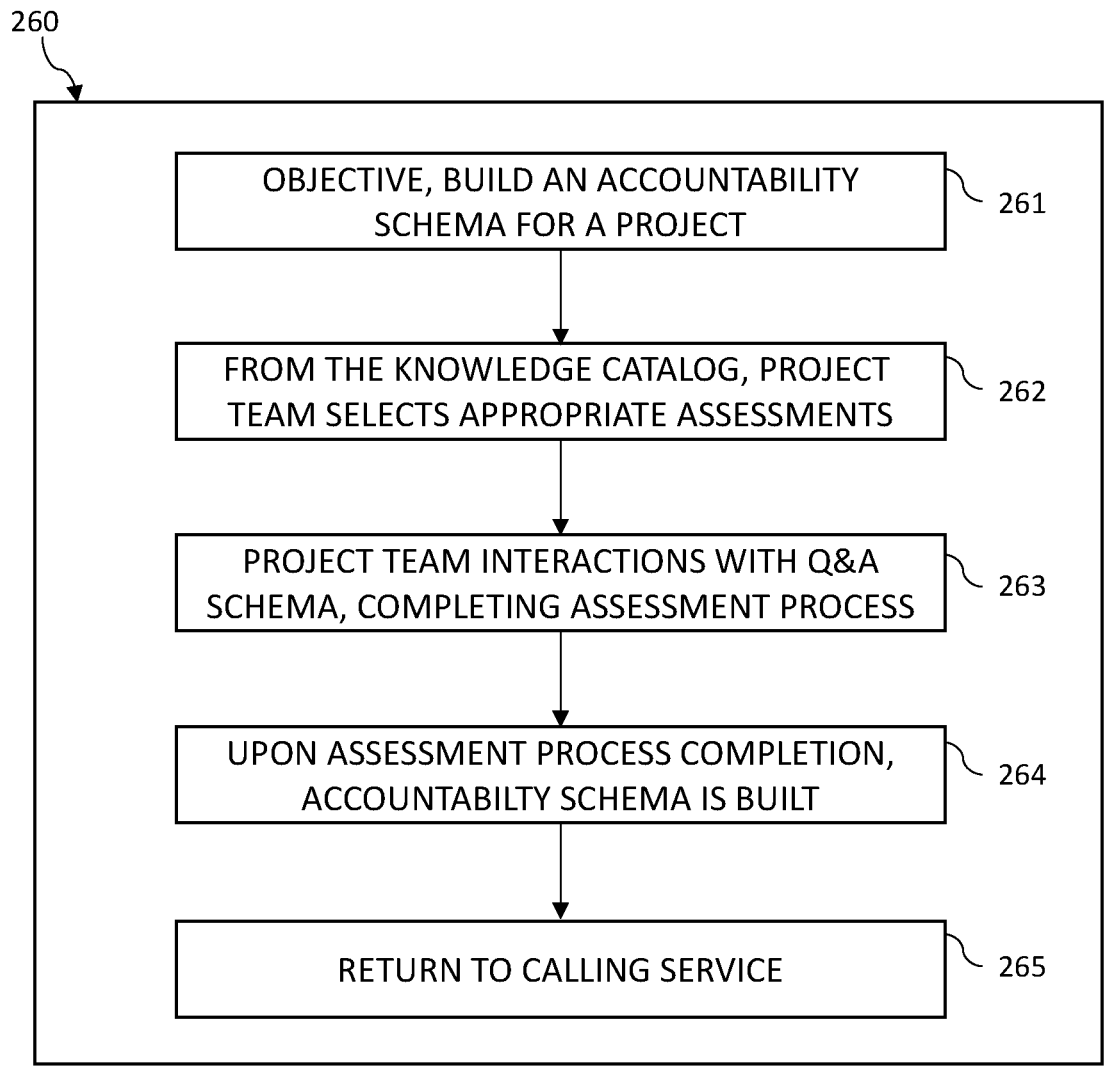
FIG. 2E illustrates a process flow for generating a project accountability schema, in accordance with various embodiments.
Figure 2F:
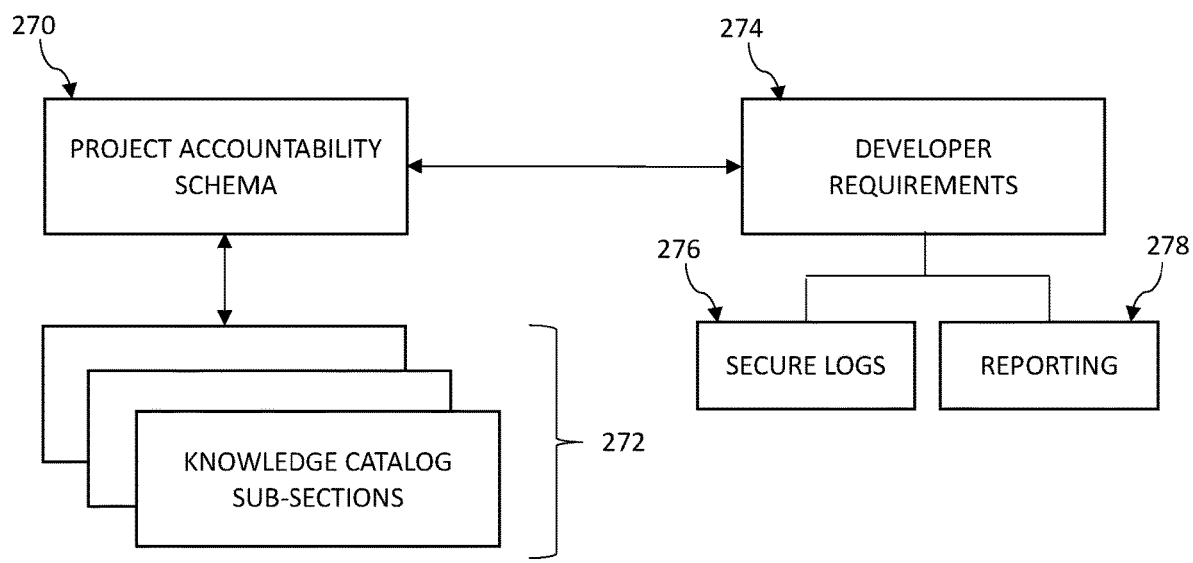
FIG. 2F illustrates a block diagram of interactions between a project accountability schema and a project team, in accordance with various embodiments.
Figure 2G:
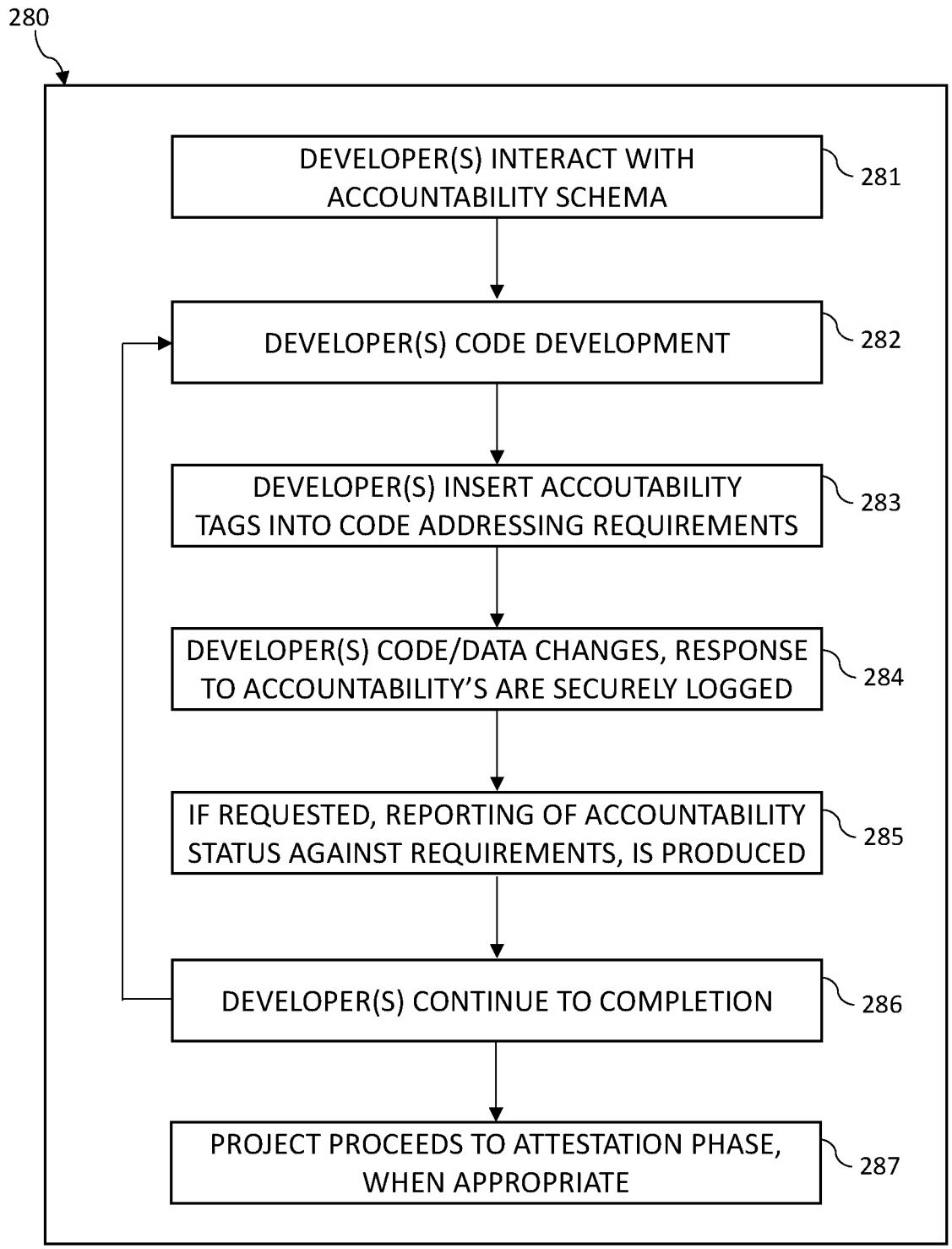
FIG. 2G illustrates a process flow for an accountability process module, in accordance with various embodiments.

Project accountability schema updates 176 and data provenance 178 processes are further illustrated and described in detail in FIGS. 2F and 2G.

Continuing with FIG. 1C, in response to the outputs of the assessment process 168 module and the accountability process module 174, an attestation process is started by the system via attestation process 180 module. The attestation process 168 enables strong cryptographic based digital signatures indicating conformance to project requirements in response to signatures input from the project team. The attestation process 168 module transforms project documentation, source code, and data into immutable digital evidence. For example, when the project team is preparing the AI/ML model to be released for usage, the digital evidence for the project may be stored for later processing and actions on a post-production basis. The attestation processes 180, evidence creation, digital signature calculations with crypto key processes 182, and FIPS-140 Rated HSMs 184 are further illustrated and described in detail in FIGS. 3A, 3B, 3C, 3D, 3E, 4A, 4B, 5C and 6.

Post prod processes 186 which may be comprised of many analytic, legal functions and reporting activities 188. Reporting activities 188 captures, for example, audit, legal actions, report, model studies and risk analysis, model inventory, and model attributes. The Post prod processes 186 and reporting activities 188 are supported via a database process 190 configured to maintain the reporting data generated by reporting activities 188 of the post prod processes 186.

The process block 192 captures existing industry AIMODELOPS practices which may interface with the system. Included in 192 are industry standard sub-processes representing AM/ML Model Development 194 (data regularization/engineering, normalization, model design, prototyping, development, verification/validation, and testing), Production Deployment 196 (resilience and release management) and Monitoring/Observation 198 of AI/ML models in production. Monitoring models in production, if performed, is one method of measuring ongoing model effectiveness. Invention processes are coupled and co-exist with industry AIMODELOPS processes, as illustrated between the interactions of 174 and 194, 180 and 196, 186 and 198. In addition, other variations of AIMODELOPS, not included in this figure, may contain candidate model evaluations, experimentation methods, metrics development and/or other model related functions.

With additional reference to FIG. 2A, a hierarchical representation of a knowledge catalog 200, including multi-domain sub-assessment types is illustrated. The knowledge catalog 200 captures project attributes, (directs) developer actions and accountabilities according to entity policy, influences implementation of ethical and privacy principles, establishes guardrails, and performs conformity assessments guided by the knowledge catalog 162 process module. The knowledge catalog 200 may be constructed from multiple sources of high integrity information and engineered in such a manner for knowledge graph representations within a database. In addition, the knowledge catalog 200 may be influenced by domain specific scholars, technical specialists and/or others, as appropriate. In this regard, the knowledge catalog 200 may be defined by multiple domain- and sector-specific assessments, risk management frameworks coupled with industry, government and legal principles, practices, and precedent.

In various embodiments, knowledge catalog 200 is organized by an ontology at the highest level, then incorporates taxonomy constructs further defining actionable knowledge, and described earlier as an Ontology, Taxonomy and Symbolic Reasoning or OTSR structure. This knowledge is represented for system 100 processing symbolically, textually, and numerically, and drives interactions with project teams. Symbolic analysis may be performed by system 100 based upon symbolic human and machine-readable representations of a problem that uses logic and inference to solve problems. Within the OTSR, the symbolic approach processes strings of characters that represent real-world entities or concepts. Symbols can be arranged in structures such as lists, hierarchies, or networks and these structures show how symbolics related to each other. Therefore, the knowledge catalog 200 may be organized by a series of detailed classifications and/or structured taxonomy conceptualized by a high-level ontology.

For example, in system 100, trust is an ontology expression or concept, and therefore can be described by a vocabulary within a taxonomy. The vocabulary captures symbolically, the elements of trust. One such element may be explanation capabilities. These elements and others may be combined with domain specific assessments of AI/ML projects developed via system 100.

Knowledge catalog 200 includes one or more subsystem processes such as, for example, project attributes and various embodiments for structuring entity policy, ethical guidelines, and governance processes 202, Algorithmic Impact Assessments (MA) 204, Social Impact Assessments (SIA) 206, Privacy Impact Assessments (PIA) 208, and Model Risk Management (MRM) 210 processes for capturing requirements. Assessment requirements derived by system 100 via AIA 204, SIA 206, PIA 208 and MRM 210, including ethical, policy and governance requirements, and/or others, may be captured within the knowledge catalog 200 by the associated subsystem and structured as a graph representation (Ontology/Taxonomy) by graph representation process 212. In various embodiments, the knowledge catalog 200 is codified as a system OTSR structure in a graph representation in via process 212. Process 212 may enable description of the knowledge catalog 200 in a manner based upon Backus Naur Form (BNF) [RFC 5511] and may be codified in JSON. In various embodiments, process 212 may output processes assessments, and legal, risk and or others framework text as symbolic constructs, tokenized in a manner that allows inference, pattern matching, natural language processing and presentations, and explanation.

In various embodiments, additional assessment types, such as Data Protection Impact Assessments (DPAI) encompassing nation-state data regulations (i.e., GDPR), data being important for quality AI/ML development and protections of constituents, and/or others, may be included. Understanding data usage is useful to AI/ML outcomes, whereby including issues such as filtering of data, obfuscation, masking, traceability, model integrity, pseudo-anonymization and/or other techniques, may be captured as part of the DPAI. In addition, the knowledge catalog 200, with project specific information, multi-domain/sector assessments, and project accountability outcomes is captured, combined with code development, and converted to digital evidence by an attestation and chain of evidence custody, by cryptographically secure and immutable processes as described herein. Assessment processes may be performed during development, pre- and/or post-launch, without limitation.

Process 202 may begin with a user entering foundational information regarding a project into the system 100 as documents 160 and/or via knowledge catalog 162 module. A user interface running on a browser and/or mobile device may prompt the user to complete a form. A form may, for example, include fields for a user to enter business owner information, mission, vision, thereby laying the foundation for establishing business accountability, including technical constituents at all levels within an organization, business and/or technical objectives of the project, entity policies, governance requirements, information necessary for maintenance and care of project, limitations of the project, and documentation of the project. Process 202 also includes specifying a schema for each input and output of the model.

Process 206 embodies Social Impact Assessment (SIAs) processes and evaluation capabilities for augmented, semi-automated and automated decisioning by AI/ML systems. In one or more embodiments, SIA process 206 is configured to evaluate affected communities and protected classes potentially impacted by the model(s) under development. In this regard, system 100 enables stakeholders, auditors, analysts and/or external constituents to examine requirements and system outcomes, ensuring them to be acceptable within the entity, legal and societal context. Additional assessment processes of SIA process 206 evaluate impacts to human-machine interface and collaboration, the entity workforce and employment, deskilling and loss of knowledge of workforce, due to work process augmentation and/or automation. In various embodiments, SIA processes 206 may focus on bias, prejudice in the data, discrimination, potential liability, legal action impacts and/or the like.

In various embodiments, the PIA 208 process is called when examining AI/ML models within entities, due to the privacy dimensions of data and/or information. The PIA 208 process may proactively drive how the engineering of models will be operationalized to include Privacy by Design (PdD) Principles and Fair Information Practices (FIPs), and/or others not mentioned here. In various embodiments, the use of privacy-enhancing technologies that may serve together with policies, procedures, and system architecture, may form privacy management requirements for the project under evaluation. Examples of privacy-enhancing technology may utilize fully or partial homomorphic encryption and de-anonymization methods, perhaps utilized for federated learning models.

Data quality, privacy metrics, and thresholds are identified and defined via the PIA 208 process to facilitate measurement during development and after deployment. By operationalizing privacy, when guided by the PIA assessment of system 100, the development team may provide full life-cycle protection via end-to-end security techniques, to deliver visibility, transparency, audit, and risk management capabilities.

PIA 208 may generate assessment outcomes to establish accountability and ensure information that is collected is used only for the intended purpose (uses and disclosures); the information is timely and accurate; the information is protected according to application laws and regulations collected via fair and lawful means; the impact of the information systems on individual privacy is fully addressed; and where appropriate, the public is aware of the information entity's collection processes (including third parties where appropriate), and how the collected information is used. These data/information processes may include retention, disposal, destruction, and redaction.

MRM 210 processes enable assessment based upon political, humanitarian, economic, legal and technology dimensions. These dimensions may be expressed in a OTSR framework, defined by the system 100, and facilitate top-down analytical methods that evolve over time. Entities may have a proprietary method for scoring risk in this context. The MRM 210 processes of system 100 include open and entity definable methods for risk-based approaches, establishing risk categorization based upon entity policies and/or regulatory requirement. In various embodiments, exemplar risk technology dimensions may include controls for data manipulations, data poisoning, and adversarial attacks against models. In addition, change control process analysis, vendor due diligence outcomes, documentation, testing, validation processes, monitoring, outcome and sensitivity analysis, model error processes and/or others.

With additional reference to FIG. 2B, a hierarchical representation of a knowledge catalog 220 is illustrated. The dashed lines indicate growth paths, which may be included in various embodiments of the knowledge catalog 220. The knowledge catalog 220 is the highest expression of its hierarchy, which in various embodiments captures the knowledge-based ontology and taxonomy of sectors, domains, assessments, policies, ethics and/or others. Under the top-level node for the knowledge catalog 220 are flexible hierarchical constructs that capture a plurality of domain-specific assessments 221 and sectors 222, ethics 223, policies 224 and other areas 225. As described above, assessments 221 captured within the knowledge catalog 220, may include AIAs 226, PIAs 227 and or others 228. Each of these sub-nodes, have multiple sub-ordinate layers, defined, and organized as needed by system 100, to capture the necessary detail to guide entity projects. For example, sector 222 may include healthcare 229, fintech or financial services 230, environmental and/or climate 231 and or others 232. The knowledge catalog is utilized to drive interactions with entity project teams and drive design accountability as illustrated in FIG. 2E.

With additional reference to FIG. 2C a block diagram illustration of an Algorithmic Impact Assessment (AIA) and associated graph hierarchy is illustrated. In this regard FIG. 2C shows the sub-hierarchical relationships and structured composition of AIA 226 analysis within the knowledge catalog 220 as described above with combined reference to FIG. 2B. The AIA 226 embodies international, domestic, governmental and sector legal, regulatory, compliance and industry best practice processes. The AIA 226 may be decomposed in hierarchical breakout, which includes US Government 235, EU 236, industry 237 and others 238 as extensible knowledge constructs for future growth.

Within block 235 representing the US Government, the hierarchy illustrates the support of Federal 239, State and Territorial frameworks in 240. Additionally, further structural decomposition supports the capture of legislative requirements 241, as legislated by Congress in and by the Senate 246 and House 247. In a similar fashion, at the US Government Federal Agency level 242, highlights further regulatory requirements such as, for example, the Federal Trade Commission (FTC) 248 and others 249 which may be added as future expansion. Further State and Territorial requirements 240 may be captured in, for example, California 243, Virginia 244, and others 245 for future expansion.

For example, pseudo-code template below captures the implementation of knowledge schema and properties for a regulatory framework:

```
(defschema AI-Regulatory-Framework (?var)
    (nation-state ?nation-state-symbol)
    (created ?creation-detail-list)
    (status ?status-label-list ?status-date)
    (regulatory-title ?title-name-detail)
    (policy-description ?policy-detail-list)
    (objectives ?objectives-detail-list)
```

-continued

```
(requirements ?requirements-detail-list)
(....)
(....)
)   ; end AI Regulatory Framework Schema Definition
```

Additionally, for example, a specific regulation may be pseudo codified in a schema, inheriting properties of a regulatory framework specifically for California 243, a proposed legislative document CA SB 13, seen below:

```
(defschema AI-Regulatory-Framework-US-CA-SB-13 ( )
    (instance-of 'AI-Regulatory-Framework)
    (nation-state 'US-CA)
    (created '((DATE-TIME-STAMP :Timestamp "20201207" :PPrint
"December 7, 2020") (AUTHORS '(CHAU :Title "Assembly Member" :Name
"Edwin Pun Chan"))
    (status '(INTRODUCED NOT-APPROVED) "20201207")
    (regulatory-title "TITLE 1.81.8. AUTOMATED DECISION
SYSTEMS ACCOUNTABILITY ACT OF 2021")
    (policy-description '((text 'TITLE "Legal framework on AI") (text
'ETHICAL "Respect of fundamental rights") (text 'PROHIBIT"Prohibited AI
practices" "Practices that have a significant potential to manipulate persons through
subliminal techniques beyond their consciousness")))
    (objectives '((ADS "Relating to automatic decision systems")
(PERSONAL-RIGHTS (............)) (PERSONAL-INFO (............))
(PROTECTED-CLASS (............))
    (BIAS '((BIAS-TESTING-DURING-DEV (............)) (BIAS-
REPORTING (.........)))))
    ... ) ; End Objectives
    (requirements '((DATA (.........)) (DEVELOPMENT (......))
(REPORTING (......)) (ASSESSMENT (......))))) ; End CA Bill No. 13
```

FIG. 2D illustrates a process flow 250 for updating a knowledge catalog with new knowledge from internal and/or external sources. The system 100 processes subject matter resources to integrate high integrity representations of knowledge domains into the OTSR. Once an update request by management is issued, a system receives the request to update the knowledge catalog (step 251). The system initiates analysis of the source documents with software tools configured by domain experts for analyzing the document(s) (step 252). In various embodiments, the system may prompt domain experts for input. The system may apply one or more Knowledge Engineering (KE) methods and/or and software tools, subject matter experts and technical specialists, codify the knowledge organized by Ontology and Taxonomic classifications into appropriate sections of the knowledge catalog hierarchy 220 based upon graph database technologies (step 253). Knowledge Engineering is a methodology of programmatically capturing human expertise. In one or more embodiments, human expertise is capture programmatically via Predicate Calculus software constructs, which captures logic, domain data, structures of patterns, inference (pattern matching and rules), and hypothesis which ultimately invokes a software method or task. Step 253 may include metadata tagging, via the KE methods, to identify to the entity if the knowledge is a regulatory and/or compliance requirement, a proposed/future requirement and/or guidance. As knowledge is being entered into the catalog for 220, including meta-data associated with this request 251, the system may apply version control tags to the knowledge catalog 220 (step 254). The system may apply quality assurance processes to the updated knowledge and may update reporting and tracking databases (step 255). In response to updating the reporting and tracking databases, the system may return to the calling service (step 256).

FIG. 2E illustrates the process flow 260 for generating a project accountability schema in system 100. Process 260 generates a list of required queries and controls subsequent interactions with the entity's project team. In this regard, the process outcome may establish requirements and accountabilities for the project to fulfill during development. The outcome may be used to construct a Project Accountability Schema (PAS), which captures requirements and accountabilities in the system, driving project teams to fulfill prior to production release. Starting with the objective to build a Project Accountability Schema, the system interacts with the entity via a series of queries. In this regard, the system may prompt the entity with a plurality of queries to define the scope of the accountability schema (step 261). The entity selects the appropriate and necessary assessments, guided by the entity's policy, industry, government regulatory and/or compliance requirements. In this regard, the system may receive a plurality of accountability schema scope inputs from the entity in response to the prompts (step 262). From these entity elections, the entity proceeds till the assessment selection process is complete. In this regard, the system may present additional prompts to the entity in response to the initial elections to further define the scope of the schema (step 263). In response to receiving the totality of inputs in response to the prompts, the system may generate the project accountability schema (step 264) and execution control may be returned to the calling service (step 265).

FIG. 2F illustrates a high-level block diagram interactions between a project accountability schema 270 and a project team. In this regard, the project developer's interchange during the development/coding process with the project accountability schema may be more fully understood. System 100, via the project accountability schema 270, internally tracks the developers progress against requirements and accountabilities 274 (encoded in the project accountability schema 270). The developer requirements 274 were captured during the assessment processes and in construction of the knowledge catalog 272. From the developer's perspective, progress against the requirements 274 may be assessed and tracked to the project accountability schema via secure logging 276 and reporting processes 278.

FIG. 2G illustrates a process flow 280 in an accountability process module in accordance with various embodiments. Via system 100 the developer may interact with the project accountability schema, and the system may receive updates (e.g., via the logging and reporting process) indicating progress to development requirements (step 281). Developers may proceed with code development (step 282). Upon completion of a requirement, developers may insert meta-tags into their computational notebook session and/or the system may insert the meta-tags. The meta-tags may tie code blocks to the specific requirements of the project accountability schema. The system may receive the meta-tags and may determine based on the meta-tags requirement progress and/or completion (step 283).

Below is an exemplary pseudo code of the system inserting the following meta-data into the code base when a developer ascertains a requirement is met:

```
// TAI-REG-BEGIN
// TAGS:= ADS BIAS PROTECTED-CLASS PRIVACY
    INFO-DISCLOSURE
// POLICY:= AI-REGULATORY-FRAMEWORK-US-CA-SB-13
// AUTHORS:= "Assembly Member Chau"
// DATETIME:= "2020:06:04:13:05:06"
// REG-POINTER-TAG:= "xCdE@pR2!3z0"
// TAI-REG-END
```

The system may securely log developer actions and code changes (step 284). For example, if the developer deletes or modifies the completed code block, the meta-tags are updated and/or removed by the system, and actions securely logged in step 284. In this regard, the secure logging process tends to assist with audit and review of tagged code. The system may generate a report against requirements completion (step 285). The developer continues code development till completed and requirements are fulfilled (step 286). The system may determine completion of all tracked requirements and, in response, proceed to an attestation phase (step 287).

Figure 3A:
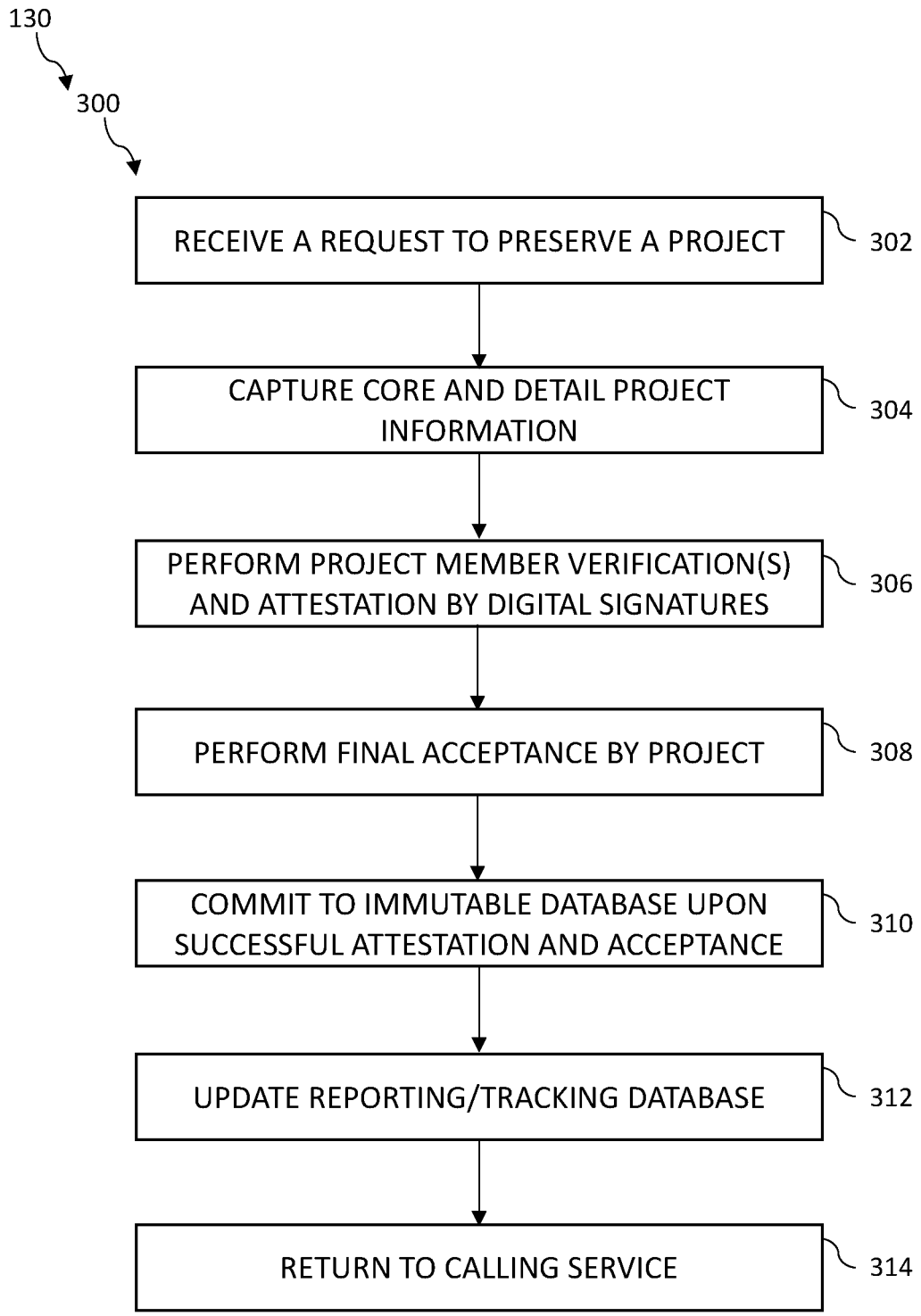
FIG. 3A illustrates a process flow for project attestation and commit of digital evidence, in accordance with various embodiments.

FIG. 3A illustrates a process 300 for project attestation and commit of digital evidence in accountability, attestation, and digital evidence module 130, according to various embodiments. Process 300 may be a multi-phase attestation process by business and project team staff, via a combination of secure digital signatures, integrity calculations, commit to preservation actions, and digital evidence creation. Developers, management, and service providers may perform preservation functions to establish and capture immutable digital evidence. For example, the value of digital evidence capture is exemplified by business requirements and corporate accountability decision points, when combined, potentially impact human safety and societal outcomes, technical design, architecture, verification, validation, quality assurance, subsequent production implementation of systems, and the like.

In various embodiments, the system captures, attests, and immutably stores the act of attestation of accountability as digital evidence for future review, audit compliance, regulatory and legal actions. Accountability in this system, includes an obligation to report, explain, or justify algorithmic decision-making, as well as mitigate any negative social impacts or potential harms. Digital evidence records prove the existence, quality, and integrity of AI/ML models at the time of attestation. All associated project information and data, including digitally signed data in a common and reproducible method, are stored over long and possibly undetermined periods of time. System methods specify the syntax and processing of an evidence record, a structure designed to support a wide range and long-term nonrepudiation of AI/ML project-related information. Integrity calculations may be performed by Merkle Tree hashing methods, including subsequent attestation methods of applying best practice digital signature methods, as will be appreciated by those skilled in the art.

In various embodiments, the system may record, per project, two blocks of immutable evidence stored in conjunction with cryptographically verifiable attestation of origin, for each attestation request.

The first evidence block may be configured to capture project design, business, and technical detail of the decision-making processes, establishing an evidentiary level and historic record of account actions (high integrity transcript) for Corporate Responsibility and accountability. Evidence may be used for future examination of AI/ML models in legal, bias, trust, fairness, safety, compliance, or regulatory matters. Methods include the capture of decision-making, and critical accountability for project management commitment to actions. Business value, corporate values and mission, technical objectives as embodied in model design and implementation are captured. These include objective functions, either multiple or singular, and optimization criteria if present.

The second evidence block may be configured to capture data used for AI/ML model training, validation/verification information, quality assurance functions and production snapshots. Methods capture standardized project information, models, parameters, quality assurance (verification and validation), and multiple instances of training, testing, and production data. To preserve provenance, integrity, and evidentiary strength for information capture over long periods of time, advanced cryptographic methods and dual process controls may be employed.

Figure 4A:
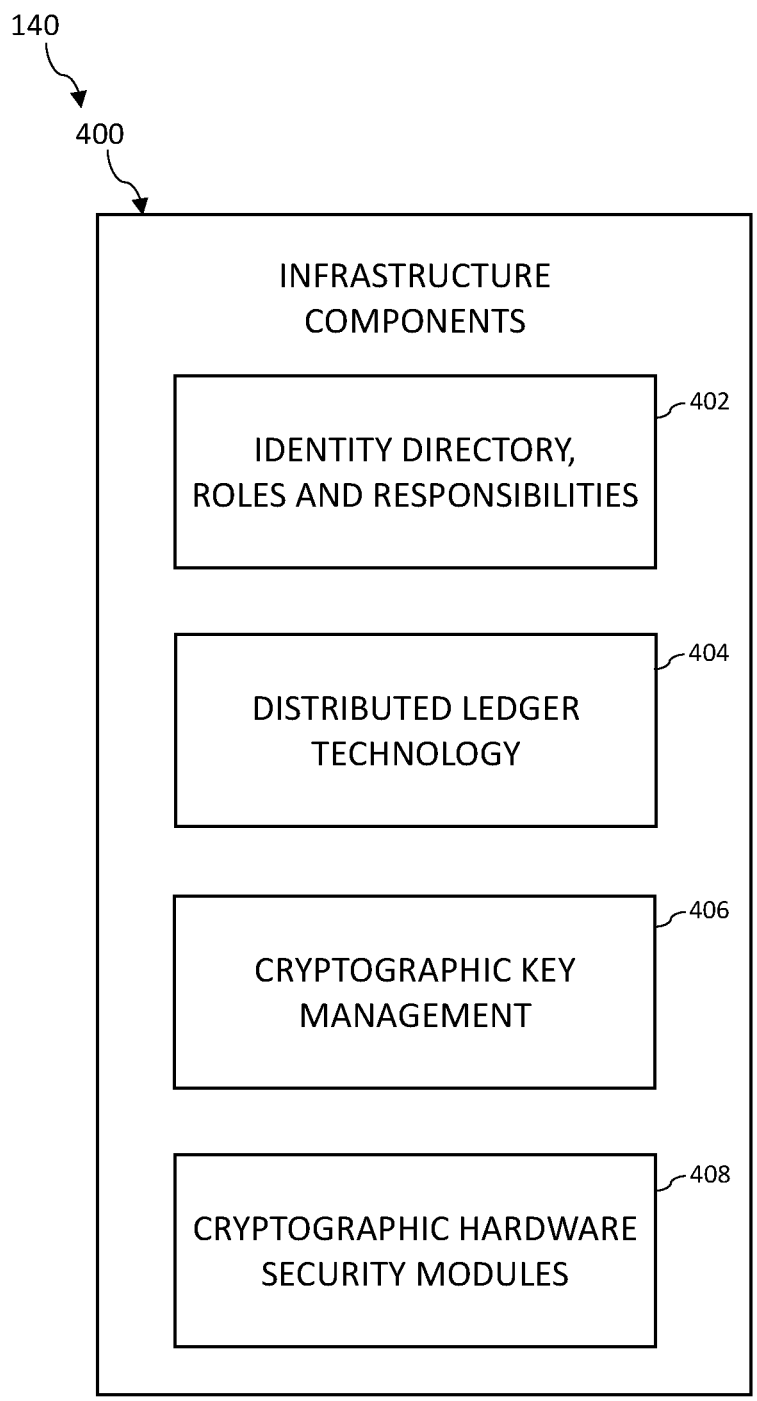
FIG. 4A illustrates infrastructure components, in accordance with various embodiments.

With combined reference to FIGS. 1A, 4A, and 3A, via the user interface 110, and upon access approved via role and policy based Active Directory entity credential authentication 402, process 300 is invoked upon receipt of a request to preserve a project (step 302). In step 304, core project information is captured by the system in a data schema. In step 306, project member status is verified by the system via Active Directory and, in response to verification, the system initiates attestation of files, data, and the like via a digital signature calculation on behalf of each project member. The system may determine all project developers and management team members have completed their attestation as a project team (step 308). In response to determining completed attestation as a project team the system may commit files to a DLT indicating final acceptance (step 310). In response to committing files to the DLT, the system may update reporting databases, tracking databases, and other system databases indicating final acceptance (step 312). The system may return control to the calling application interface (step 314). In this regard, system 100 enables preservation of provenance and integrity as evidence over long periods of time by employing cryptographic methods and process controls in contrast to written signatures.

Figure 3B:
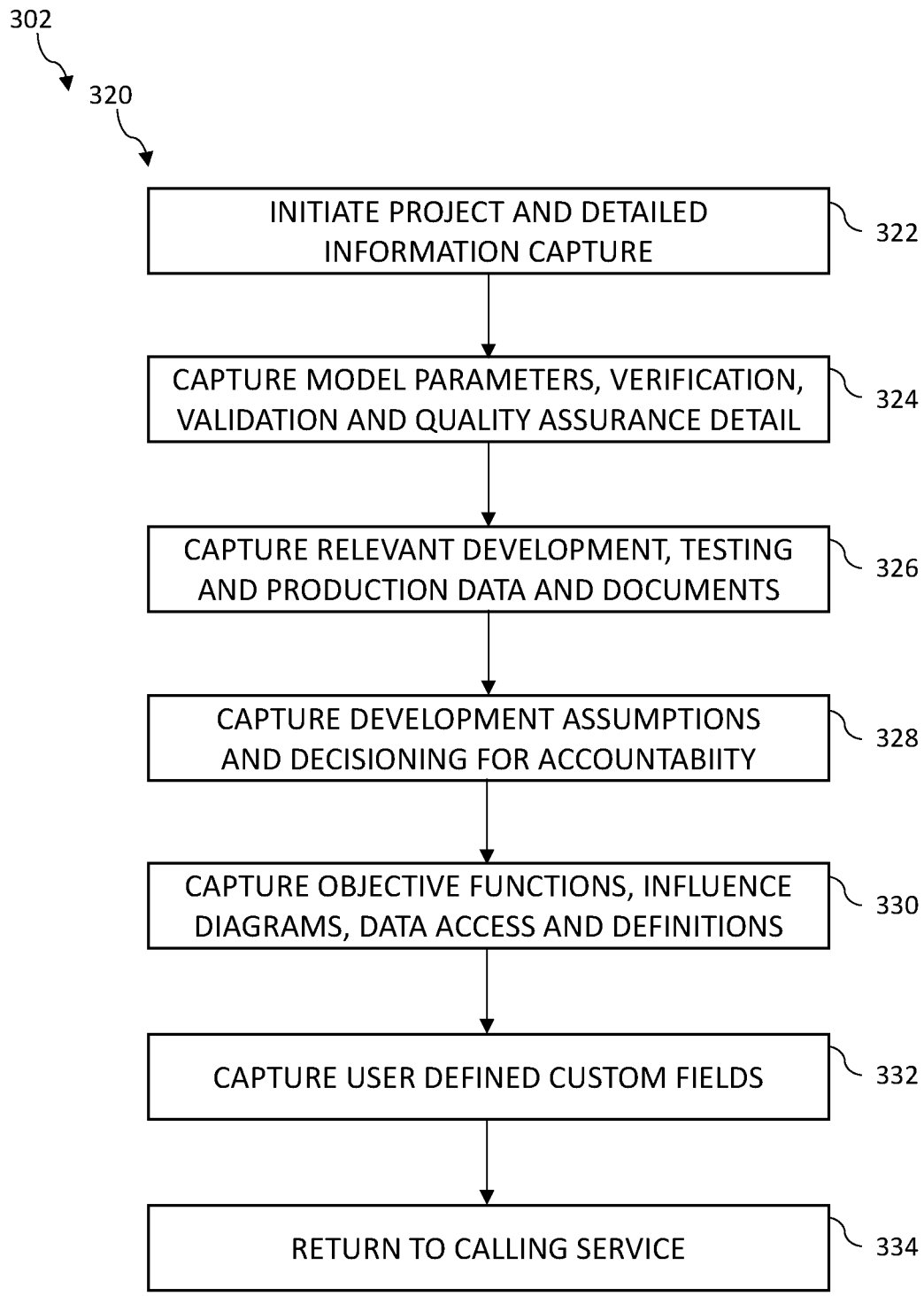
FIG. 3B illustrates a process for creation of immutable digital evidence, in accordance with various embodiments.

With additional reference to FIG. 3B, a process 320 for creation of immutable digital evidence is illustrated according to various embodiments. Process 320 may be a subprocess of step 302 described above with reference to FIG. 3A. Process 320 may be initiated by the system capturing initial project and associated detail (step 322). In response to the capture of initial project information, the system captures model parameters, all variables and data associated with verification, validation, quality assurance detail, and the like (step 324). The system may capture development, testing, and production data and associated documents (step 326). The system may proceed to capture development assumptions, design criteria and all key project decisions that possibly impacts outcomes, which may be used by the system to establish accountability (step 328). The system may capture decision support methods and model objective functions, influence and relevance diagrams, data availability and access, data definitions, and the like (step 330). In addition, the system may capture other information via entity and user defined custom fields (step 332). The system may determine completion of process 320 and return to the calling application (step 334).

Figure 3C:
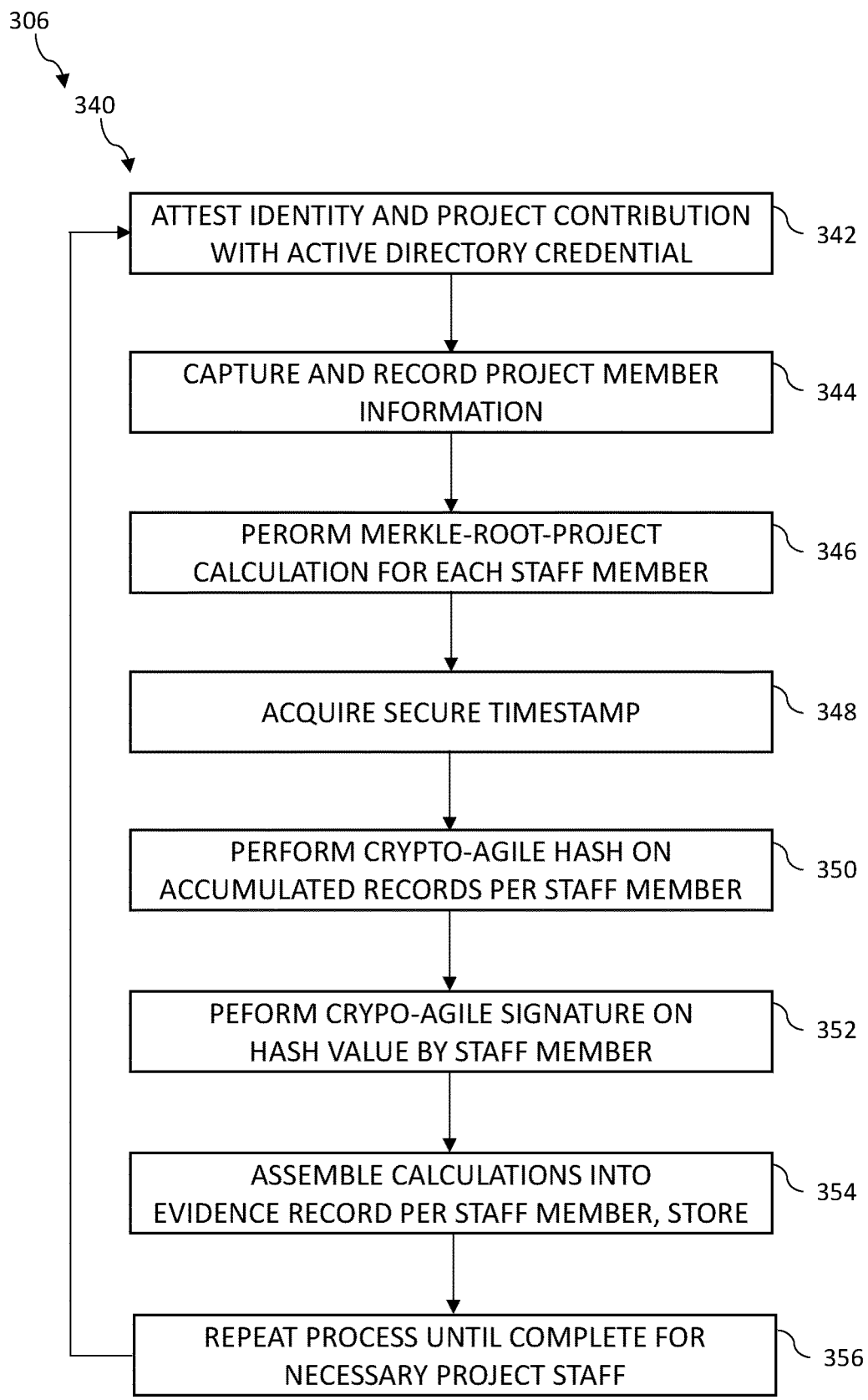
FIG. 3C illustrates a process for creation of immutable digital evidence, in accordance with various embodiments.

In various embodiments, and with additional reference to FIG. 3C a process 340 for creation of immutable digital evidence is illustrated. Process 340 may be a subprocess of step 306 described above with reference to FIG. 3A. Overall, process 340 performs the calculations for evidence record components. Process 340 assembles information, which includes AI/ML model source code and file/directory trees, attributes, documentation, and data. In step 342, project member status is verified by the system, for example, via Active Directory. In step 344, the system captures the project member information, within a project schema and is a key step in the accountability process. Project member information includes the person, contributing to the development process, organization, title, role, contractor/employee status, email address, phone, their leader's name and/or the like.

The Merkle root calculation, generates a cryptographic proof for a large amount of data is performed by the system in step 346 on the information captured step 344. The system acquires a high integrity and secure timestamp and combines the timestamp with the data of steps 344 and 346 in step 348. With brief additional reference to FIG. 6, step 348 includes calling, by the system, a timestamp agent 600. The system hashes the output of step 348 in combination with individual project member information in step 350. Together, the hash record associated with each project developer (including relevant developer information captured in step 344) is cryptographically signed by the developer's private asymmetric key in step 352, utilizing a ESCDA digital signature algorithm. An evidence record is created by the system and immutably stored in a DLT in step 354, thereby establishing project developer provenance and accountability. Finally, in step 356 the system repeats steps 342, 344, 346, 348, 350, 352 and 354 for each project team developer. As input to the calculation process are records just described, organized in a tree structure, whereby each node is hashed recursively up the tree structure, ultimately generating a unique root output hash value. The output of a Merkle root calculation is a 32-byte hash value.

As each project developer record is assembled by the system, each step reverifies the Merkle root calculation for the project hierarchy and compares the record to other project developer calculations. If the calculated value fails to match, the system may determine a change has occurred indicating a project integrity issue amongst project developers, and the process fails. In response to determining a process failure, the system may restart the process at step 340. Upon completion of the attestation, commit, hash and signing process for each project developer, the system may repeat process 340 for each of a plurality of project management representatives.

Figure 3D:
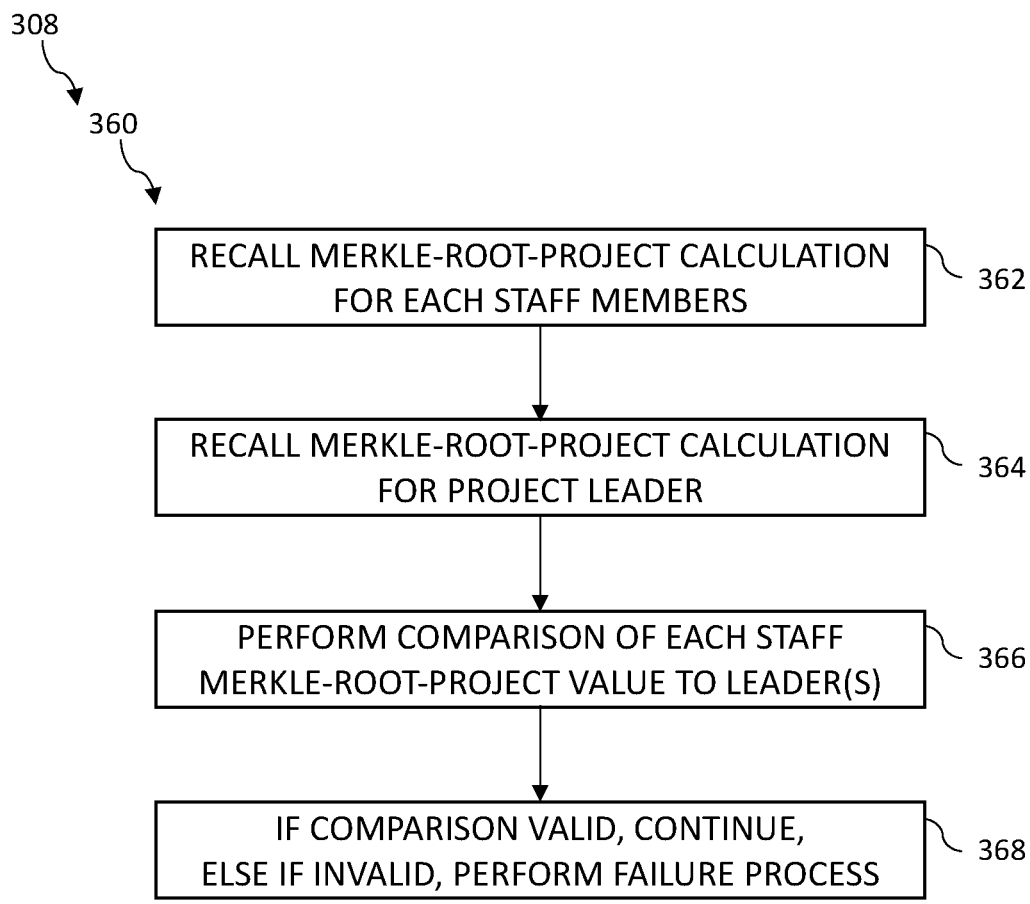
FIG. 3D illustrates a process for creation of immutable digital evidence, in accordance with various embodiments.

With additional reference to FIG. 3D, a process 360 for creation of immutable digital evidence is illustrated according to various embodiments. Process 360 may be a subprocess of step 308 described above with reference to FIG. 3A. The Merkle root calculation is recalled by the system for all project developers in step 362. In step 364, the MERKLE ROOT CALCULATION for project management is recalled, and compared by the system to each developer's stored values in step 366. In this regard, the system determines whether changes have occurred between the values indicating changes in-between project attestation steps. The system thereby may ensure no changes have occurred in-between project attestation steps and may progress, or if a match fails, the process fails (step 368). In response to the process failing, the system may reset, and the process is re-initiated. The number of iterative attestations and the timeframe of the process itself, may be established by the entity's internal policy, thereby establishing appropriate attestation processes, and minimizing the opportunity for collusion.

Figure 3E:
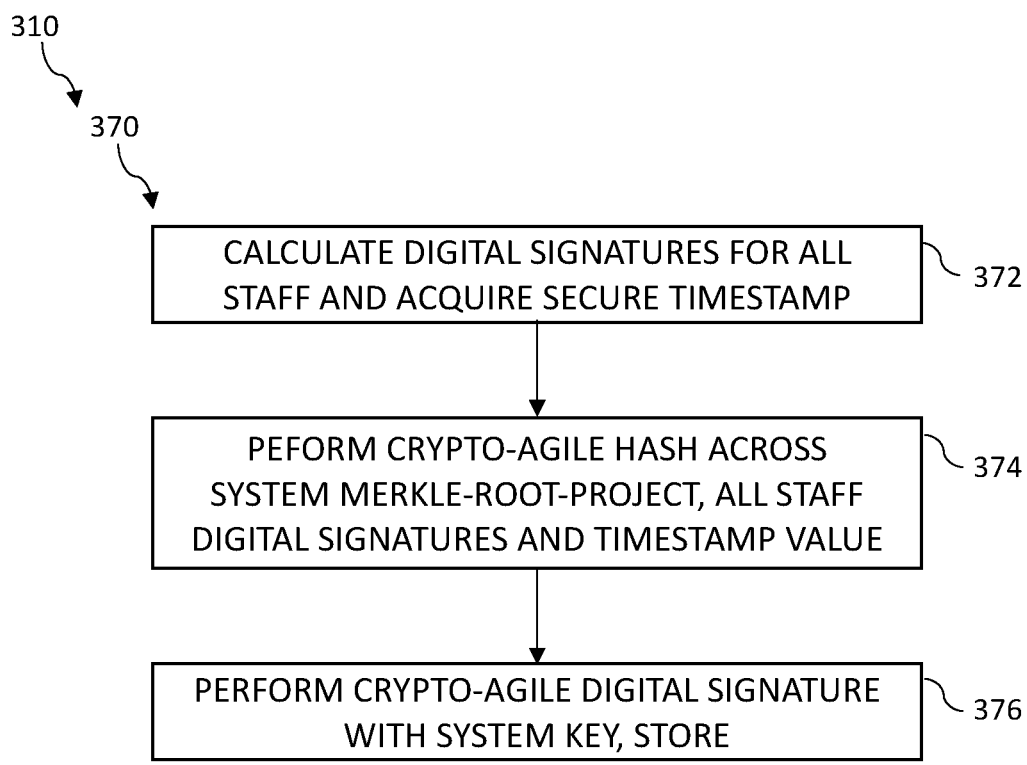
FIG. 3E illustrates a process for creation of immutable digital evidence, in accordance with various embodiments.

With additional reference to FIG. 3E, a process 370 for creation of immutable digital evidence is illustrated according to various embodiments. Process 370 may be a subprocess of step 310 described above with reference to FIG. 3A. In step 372, the system may calculate the digital signature for each project staff from their respective Merkle root value and capture a timestamp from timestamp agent 600. In step 374, the system may perform a hash across all Merkle root values and digital signatures for project staff with a timestamp from timestamp agent 600. In step 376, an independent and final level signature is created by the system, either by combination with a system key pair or by an external 3rd party (such as, for example, an auditing agency, a government agency, a certification organization, and/or the like), as selected by the entity. The final signature from step 376 is committed by the system to a DLT entry and dashboards are updated by the system for the project preservation, with all related information.

Referring now to FIG. 4A, infrastructure components 140 are illustrated in accordance with various embodiments and may comprise a plurality of subcomponents 400. Subcomponents 400 may include user access and system administration via standards-based identity protocols 402. Protocols 402 may include, for example, OpenID, SAML, FIDO and W3C's Decentralized Identifier (DID), Verifiable Claims (VC) and Zero-Knowledge Proof (ZKP) open specifications. For system administration, user access and administration are achieved via authentication and authorization controls, may include a DLT permissioned methodology, which may use a non-permissioned method for public and non-proprietary model and data administration.

Subcomponents 400 may include a DLT 404 utilized by the system for immutable storage of digital evidence and maintaining chain of custody (i.e., the Forensic-Chain Distributed Ledger Technology). In various embodiments, the DLT may comprise Microsoft Azure's Hyperledger Blockchain, cryptographic constructs via Hyperledger Ursa libraries, and systematic performance evaluations by Hyperledger Caliper. Hyperledger related technologies are developed on an opensource basis by the Linux Foundation.

Subcomponents 400 may include a cryptographic Key Management System (KMS) 406. KMS 406 may employ lifecycle processes (e.g., NIST SP800-57) as embodied in the system infrastructure and operational procedures and applied to public-private key and digital signature cryptographic methods. It will be appreciated by those skilled in the art, as Cryptographic Key Management Lifecyle includes many processes, such as Generation, Renewal, Rollover, Archival, Audit, Splits, and Compromise components.

Subcomponents 400 may include cryptographic hardware security modules 408. Cryptographic hardware security modules 408 may include industry best practices for the physical protection of private key cryptographic material, for those skilled in the art.

Figure 4B:
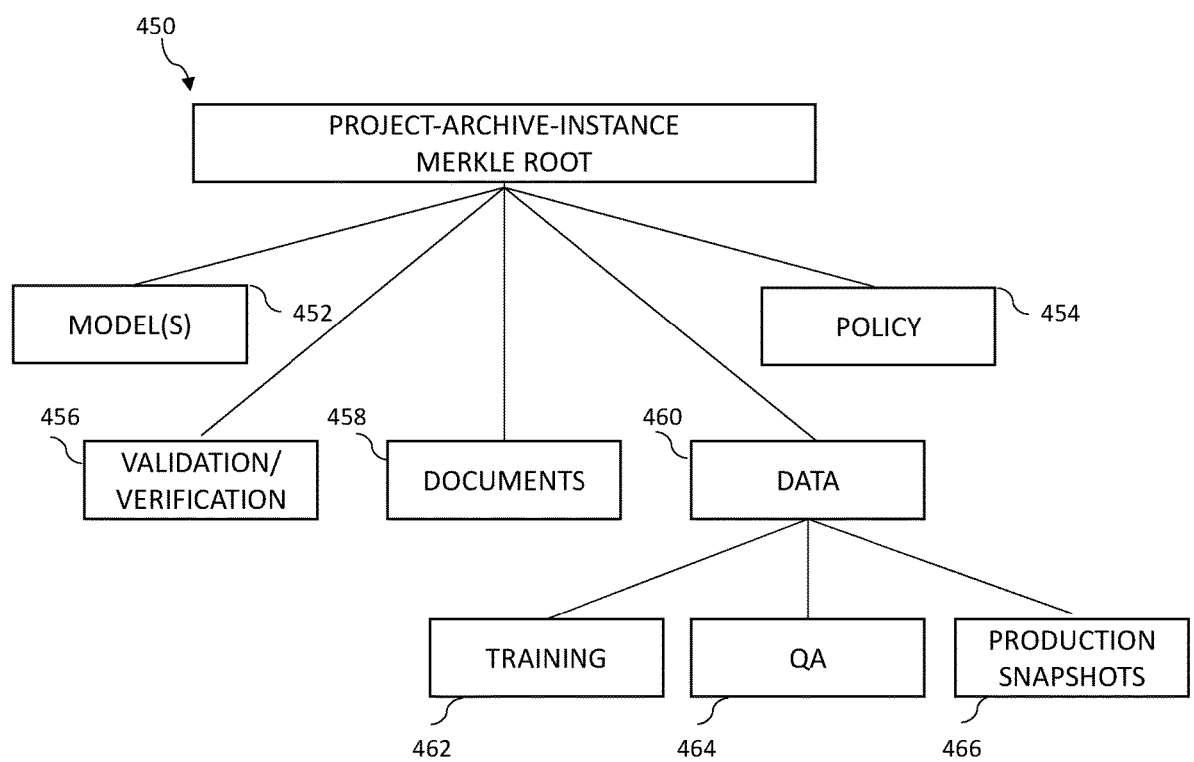
FIG. 4B illustrates a hierarchy of inputs for a Merkle Tree calculation, in accordance with various embodiments.

With reference to FIG. 4B, a hierarchy of inputs for a Merkle tree calculation is illustrated in accordance with various embodiments. Project Archive Instance Merkle Tree hierarchy 450 and the recursive generation of a unique hash that captures the integrity of all sources of project information as one message value. In various embodiments, the hierarchy 450 serves as a basis for the calculation includes AI/ML model source code 452, entity policy statements and or other governance documents 454 associated with the entity's project, AI/ML model validation and verification parameters 456 created during development and testing, relevant forms of project documentation 458, and data 460 which may include data utilized in project development for training 462, quality assurance 464 and/or production snapshots data 466. In various embodiments, the system may perform the Merkle tree calculation in accordance with RFCs 6234, 4998 and 8391.

Figure 5A:
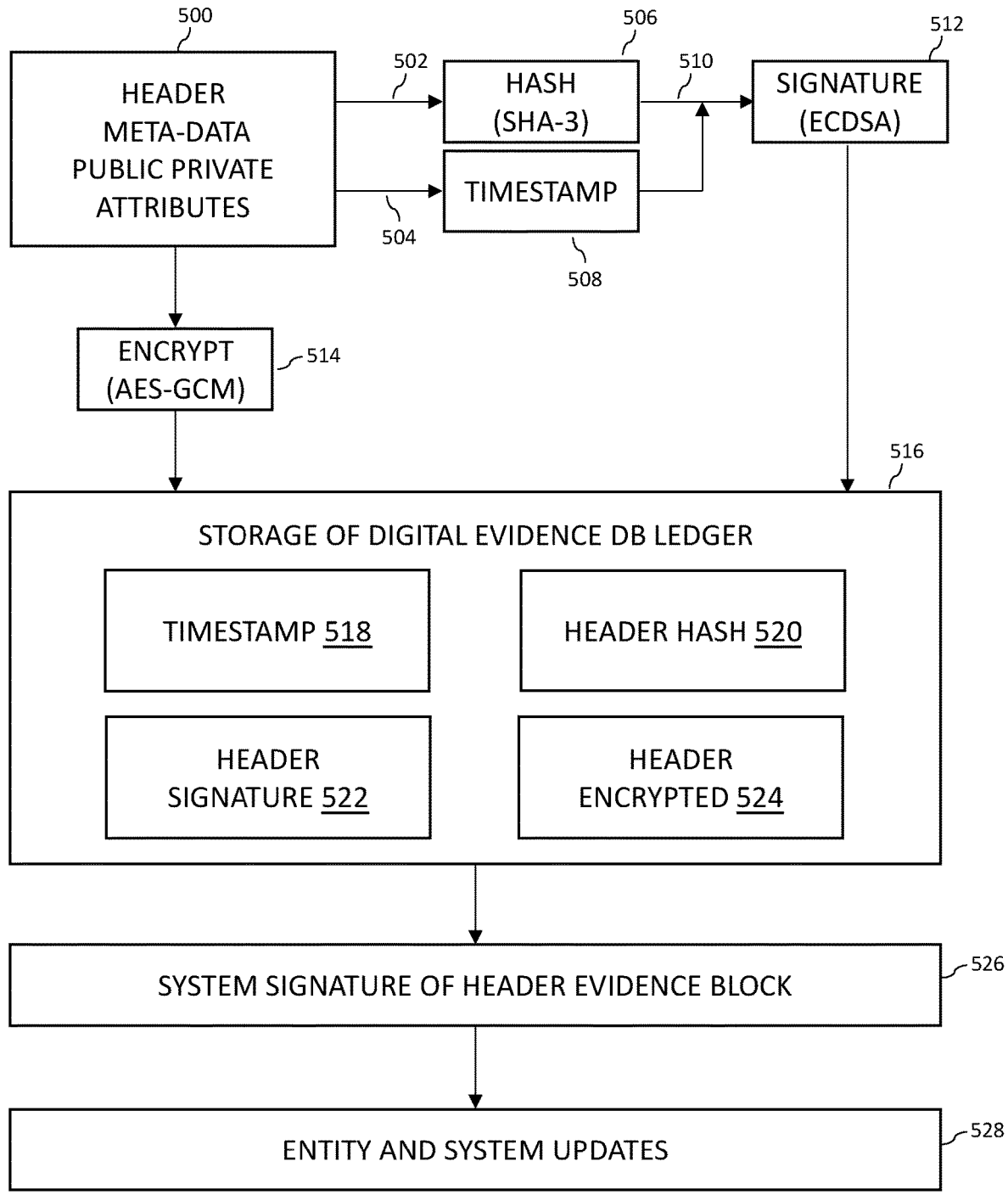
FIG. 5A illustrates a process flow for storage of digital evidence, in accordance with various embodiments.
Figure 5B:
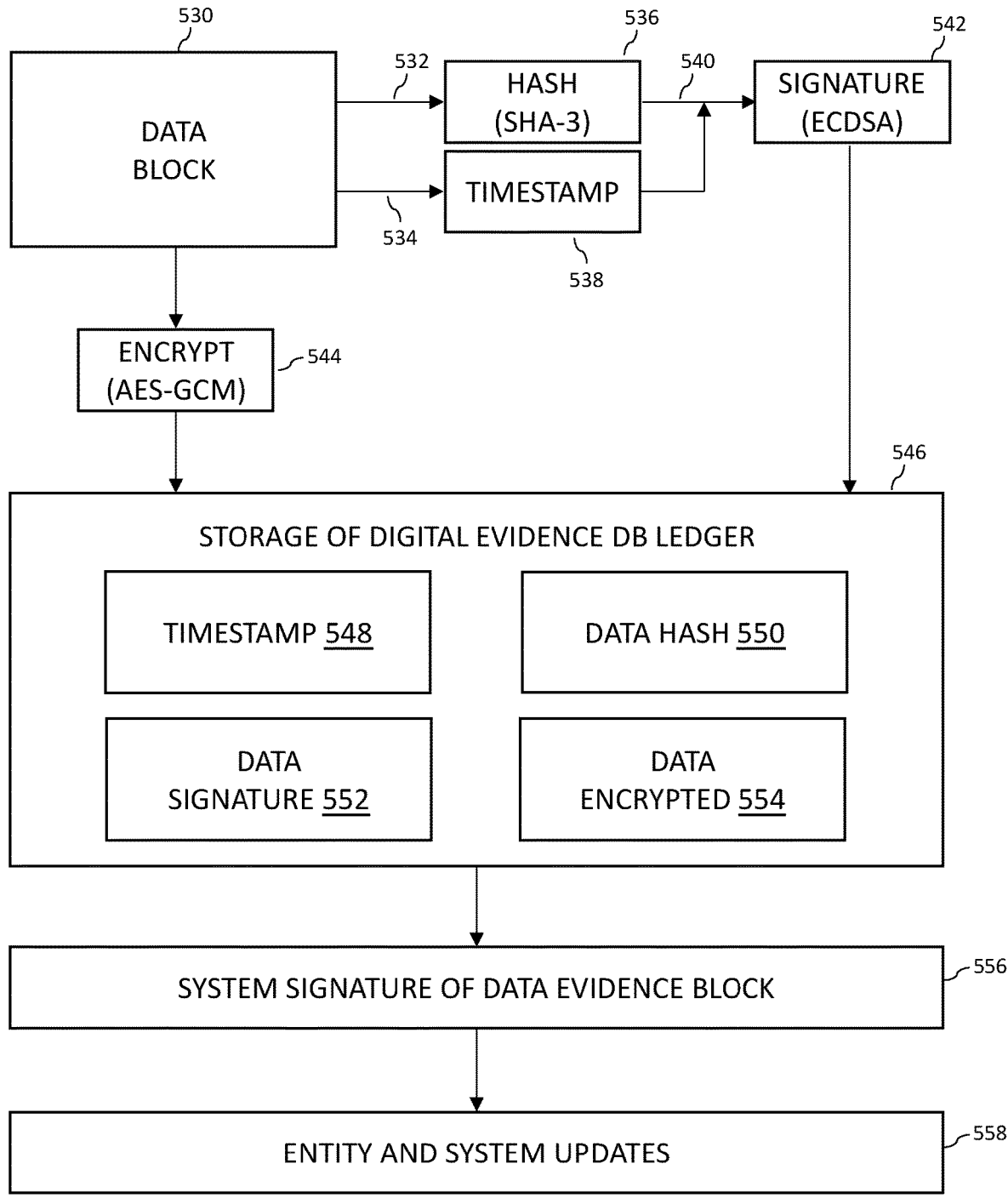
FIG. 5B illustrates a process for storage of digital evidence, in accordance with various embodiments.
Figure 5C:
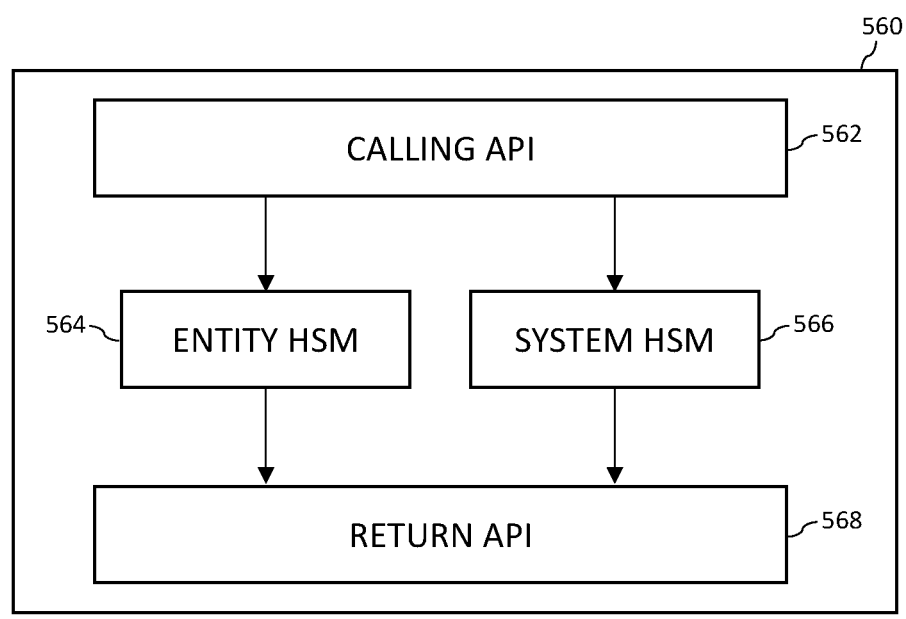
FIG. 5C illustrates a block diagram of a secure hardware cryptographic device, in accordance with various embodiments.

With additional reference to FIGS. 5A, 5B and 5C, block diagram illustrations for operations describing a series of scenarios where the system captures and retains large files as digital evidence, secure storage techniques and cryptographic-based methods utilized to establish key aspects of the digital evidence chain of custody are illustrated.

Large project related files may be broken into two blocks by the system. The first block is the header and/or meta-level datum (public and/or private attributes) associated with the project represented in FIG. 5A, and the second is the body (object) of data used for development and testing purposes represented in FIG. 5B. The system performs cryptographic confidentiality and integrity calculations on each block. Secured data has authenticity requirements that establish provenance and integrity, and is securely stored as future digital evidence, and/or fulfills additional revalidation, monitoring, bias analysis, audit, regulatory, and compliance requirements. In various embodiments, large data sets may be stored by the system on premise by the subscribing entity, transferred to a cloud storage and/or performed in either or a combination of these scenarios, as part of the system service.

In various embodiments, transforming DICOM files is a prototypical example of methods which may be employed by the system to ensure the confidentiality and integrity of large file transmission and storage, as evidence. As examples, digital image files are commonly used for CT, MRI, SPECT, PET, and computer-aided diagnosis, which includes cardiology, mammography, surgery, endoscopy, radiology, dentistry, pathology clinical diagnostic domains and the like. If the entity utilizing the service requires per the entity's policy, the system may perform de-identification of data and/or removal of Personal Health Information (PHI) or selected Personal Identifiable Information (PII) illustrated in DICOM images, a Flywheel CLI process may be evoked by the system to de-identify data.

With reference now to FIG. 5A a process flow for storing a header block 500 of digital evidence is illustrated in accordance with various embodiments. FIG. 5A is a block diagram illustrating a layered stack of authenticity, encryption and integrity operations which may be executed with strong ciphers and hash functions, such as advanced encryption standard-Galois Counter Mode AES-GCM (FIPS 197, NIST SP800-38D) encryption and SHA-3 (FIPS 202, IUF API C-based) cryptographic methods. The Initial Vector (IV) for AES-GCM is supplied to the system by the entity, and is stored off-line incorporating physical security controls, tamper-evident protections, audit, and break-the-glass defined use cases, as understood by those skilled in the art.

Header 500 is created as a combination of public and private data fields provided by the entity to the system. The system generates the header data schema is created in 500, and header data schema is then forwarded via an API call 502. The header 500 is hashed by the system via a SHA-3 function 506. The output of 506 is a unique value. The system may be designed with crypto agility as an architectural requirement and can thereby switch to other hash methods as the industry dictates. In parallel to the hashing method described above, the creation of a high integrity time stamp is triggered at 504, via the system calling the timestamp agent 600, executed at time stamp process 508. The hash 506 output and the timestamp process 508 output are integrated at 510, creating a merged input field for a digital signature method 512. In this manner, the system forms a highly secure digital signature of the header data and timestamp. In various embodiments, the digital signature methods use ECDSA. The header block 500 may be bulk symmetric encrypted by AES-GCM process 514 and included as an encrypted header 524 field in a digital evidence block 516. Supplementary header data related objects in digital evidence block 516 are comprised of an additional system action-related timestamp 518, the SHA-3 hash of the header 520 calculated by function 506, digital signature of the header 522 calculated by digital signature method 512 and the encrypted header data 524 calculated by symmetric encryption process 514. The system signature operation 526 calculates a digital signature of the hashed digital evidence block 516, utilizing the ECDSA system key, thereby enhancing the security and integrity of the digital evidence chain of custody data transfer from the entity to the system's custody. The entity and system databases and visual interfaces are updated by the system to reflect the completion of the storage and transfer of custody of the digital evidence header block in process 528.

With reference now to FIG. 5B a process flow for storing a data block 530 of digital evidence is illustrated in accordance with various embodiments. Data block 530 comprises a data schema for a body of data. The data captured in 530 may be represented by many data formats or types, however, does not have bearing on the downstream cryptographic functions. The system generates the data block data schema in 530 and the data schema is then forwarded via an API call 532. The data block 530 hashed by the system via a SHA-3 function 536. A high integrity timestamp process is invoked at 534 and is created by the timestamp process 538, from calling a timestamp agent 600. The outputs of the hash function of the data block 536 and timestamp process 538 are combined by the system at 540, as an input to the ECDSA digital signature calculation 542. In addition, the data block 530 is encrypted by encryption process 544, then combined by the system with the digital signature output of 542 forming a digital evidence data block 546 in preparation to be stored on an immutable database ledger. As a component of digital evidence data block 546, a new high integrity timestamp 548 is created, timestamping the creation of the digital evidence data block 546. The hash of the digital evidence data block 536 is captured as a field for storage in 550. The digital signature output of the data block 542 is captured as a field for storage in 552. The encrypted data block output of 544 is captured for storage as 554, and thereby the data fields 548, 550, 552 and 554 become the digital evidence data block 546. The digital evidence data block 546 is then cryptographically signed by the system key 556, as solidifying a step in digital evidence creation for data. Both, the block 546 and system signature output 556, are stored in an immutable database. Subsequently both the entity and system records are updated 558.

For cybersecurity purposes, header data 500 and body data 530 may be scanned by the system for various forms of malware and other nefarious illicit information and or code, then remediated prior to performing encryption and signing methods, as described above.

The system may employ AES-GCM encryption methods which provide favorable execution performance metrics as compared to other AES variants. Confidentiality may be ensured, as the encrypted data is highly uncorrelated to the original plain text data and ascertained by similarity, entropy, and histogram analysis. Cryptographic agility architectural constructs (NIST SP800-131A and SP800-175B, RSA PKCS, and RFC7696) may be used by the system to support interoperability and incorporate techniques for cryptographic algorithmic rollover and associated cryptographic key management changes to next generation algorithms, such as Post Quantum Encryption (PQE). Integrity and authenticity are established via ECDSA digital signatures, specifically Ed25519, by creating and associating with each system entity user. Ed25519 has a time-constant implementation, and is resistant to side-channel, timing, and cache attacks.

With additional reference to FIG. 5C, a block diagram of a secure hardware cryptographic device 560 is illustrated in accordance with various embodiments. The system may include external API interfaces with hardware security modules such as secure hardware cryptographic device 560 for highly secure cryptographic operations. The system may employ hardware, firmware, software, and/or any combination thereof for cryptographic security.

In various embodiments, secure key management is performed by device 560. A calling API 562 queries FIPS 140-3 and/or FIPS 140-4 Hardware Security Modules (HSMs), depending upon the specific request for entity or system encryption and/or signing keys. HSMs provide enhanced security controls and the preventative measures against key compromise. Cryptographic key material is controlled within legal jurisdiction of the data and oversight thereof, for the entity utilizing the service, if so, required by nation-state law. Each subscribing entity controls the full lifecycle of cryptographic key assets via m-of-n Key Signing Officers (KSO) ownership and key management lifecycle controls, anti-collusion, and business continuity functions. There may be multiple instances of Entity HSMs 564 and System HSMs 566, depending upon the legal and privacy jurisdiction operational requirements. As a result, from the API based request from calling API 562, return API 568 returns the requested cryptographic asset. Calling API 562 and return API 568 may be coded to the Public Key Crypto Standard (PKCS #7 and #11).

It will be appreciated, given the potential of long-term data and secure digital evidence storage, that data re-encryption and integrity re-calculation capabilities are supported for regulatory and policy-driven data retention, and the needs associated with evolving cryptographic algorithmic requirements. Data retention policies are specified, instituted, and affirmed regularly by the entity institution. If data is removed by policy, the system retains an immutable record of time date stamp, data, end-entity user and/or privileged system account, which performed the original action.

Figure 6:
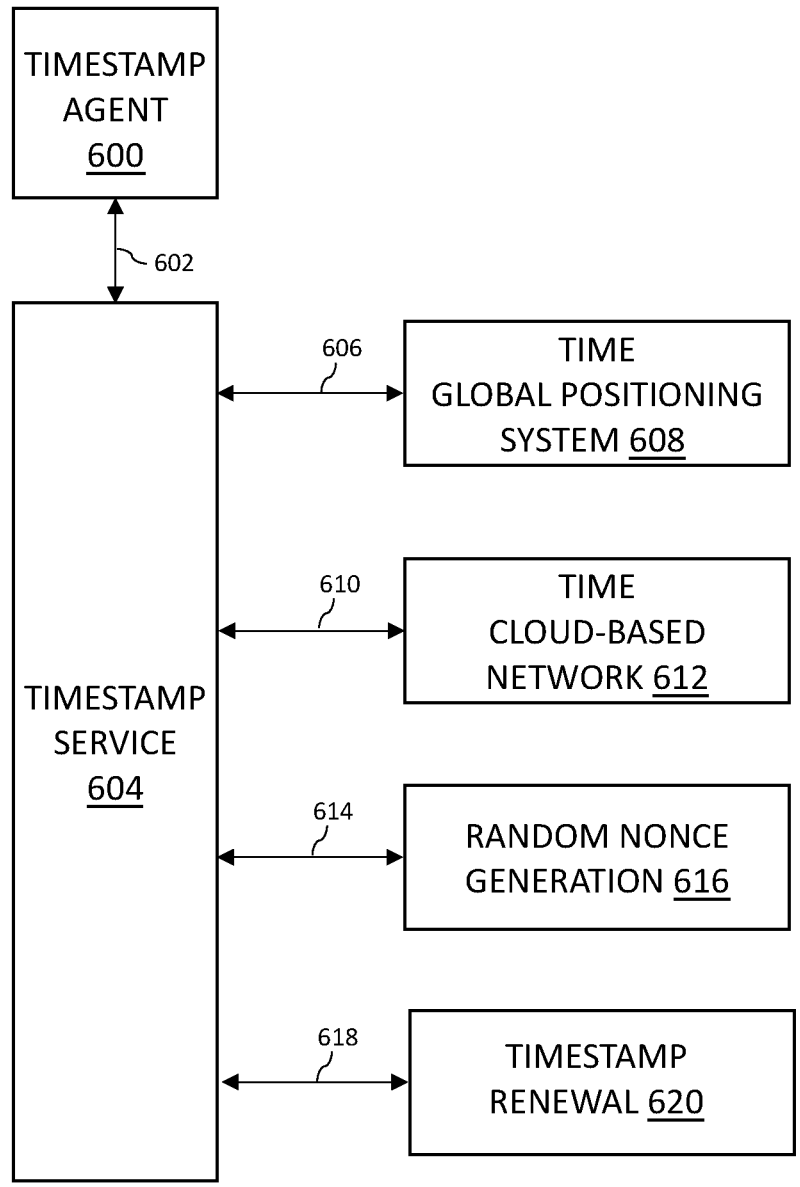
FIG. 6 illustrates a functional block diagram of a high integrity and reliable timestamp generation method, in accordance with various embodiments.

With additional reference to FIG. 6, a functional block diagram of a high integrity and reliable timestamp generation method is illustrated in accordance with various embodiments. In various embodiments, an application API call interacts with the timestamp agent 600 (tsAgent). An API request/response method 602 enables communication between the requesting timestamp agent 600 and the responding timestamp service 604. The timestamp service 604, when invoked, may return a value in JSON message formatted by the ISO 8602 Universal Coordinated Time (UTC) standard, or if several subservices are unavailable, a unique nonce value.

Within the timestamp service 604 (tsService), the service invokes sub-systems in order, which may include a Global Positioning System (GPS) timestamp subsystem 608, second in order may be a cloud-based accessible access to time generated by the Network Time Protocol (NTP) subsystem 612, and lastly a random and unique method to create a NONCE value 616. The timestamp service 604 executes these subsystems step by step, until a valid timestamp is determined and/or a random default NONCE is calculated and returned to the timestamp agent 600 via the timestamp service 604. Once a valid timestamp is determined, the subsequent steps do not occur. The NONCE calculation method 616 is executed, as a resilience default method, if either sub-system 608 or 612 fail to return a valid timestamp or timeout.

Within the timestamp service 604 (tsService), invoked by communication method 602, calls GPS timestamp subsystem 608 via request/response method 606. If the GPS sub-system is determined by the system to be unavailable, a TIME_GPS_FAIL flag is returned to the tsService 604. Based upon the failure flag, tsService 604 then calls a cloud-based Network Time Protocol (NTP) subsystem 612, invoked by a request/response method 610. If subsystem 612 is available and successful, a JSON messaged formatted in UTC may be returned to tsService 604 via method 610, otherwise a TIME_NTP_FAIL flag is returned to tsService 604 via method 610. Cybersecurity protection controls may be embedded in processes to address known attack vectors against NTP.

If both GPS 608 and NTP 612 sub-systems fail, tsService 604 requests a randomly generated NONCE 616, via request/response method 614. The NONCE is a 64-bit integer generated from a secure random number generator. The NONCE calculation is architecturally Quantum-capable, in anticipation of Quantum Random Number Generators (QRNG). Operationally, the tsService 604 may poll timestamp subsystems 608 and 612 based on defined service polling priorities and timeout profiles, which may be in the configuration file associated within tsService 604. GPS subsystem 608 timeouts may be adjustable to less than 1000 milliseconds, allowing for device response. NTP subsystem 612 timeouts may be adjustable to less than 2000 milliseconds, allowing for network latency and device response.

If by tsService 604, a timestamp renewal is requested via the tsAgent 600, a timestamp renewal subsystem 620 is invoked via request/response method 618. Subsystem 620 is driven by the invalidity of the mechanism used to generate the previous timestamp values and the associated data signatures. Invalidity may occur, for example, due to cybersecurity compromise, cryptographic rollover scenarios, and/or methods which may include periodic renewal techniques for timestamps as driven by entity-driven policy. Subsystem 620 obtains a new timestamp invoking subsystems 608, 612 or 616, depending upon availability, as described above. A time-ordered list of a sequence of timestamps may be generated during renewal operations, thereby enabling the system to maintain a historic operations record.

Figure 7:
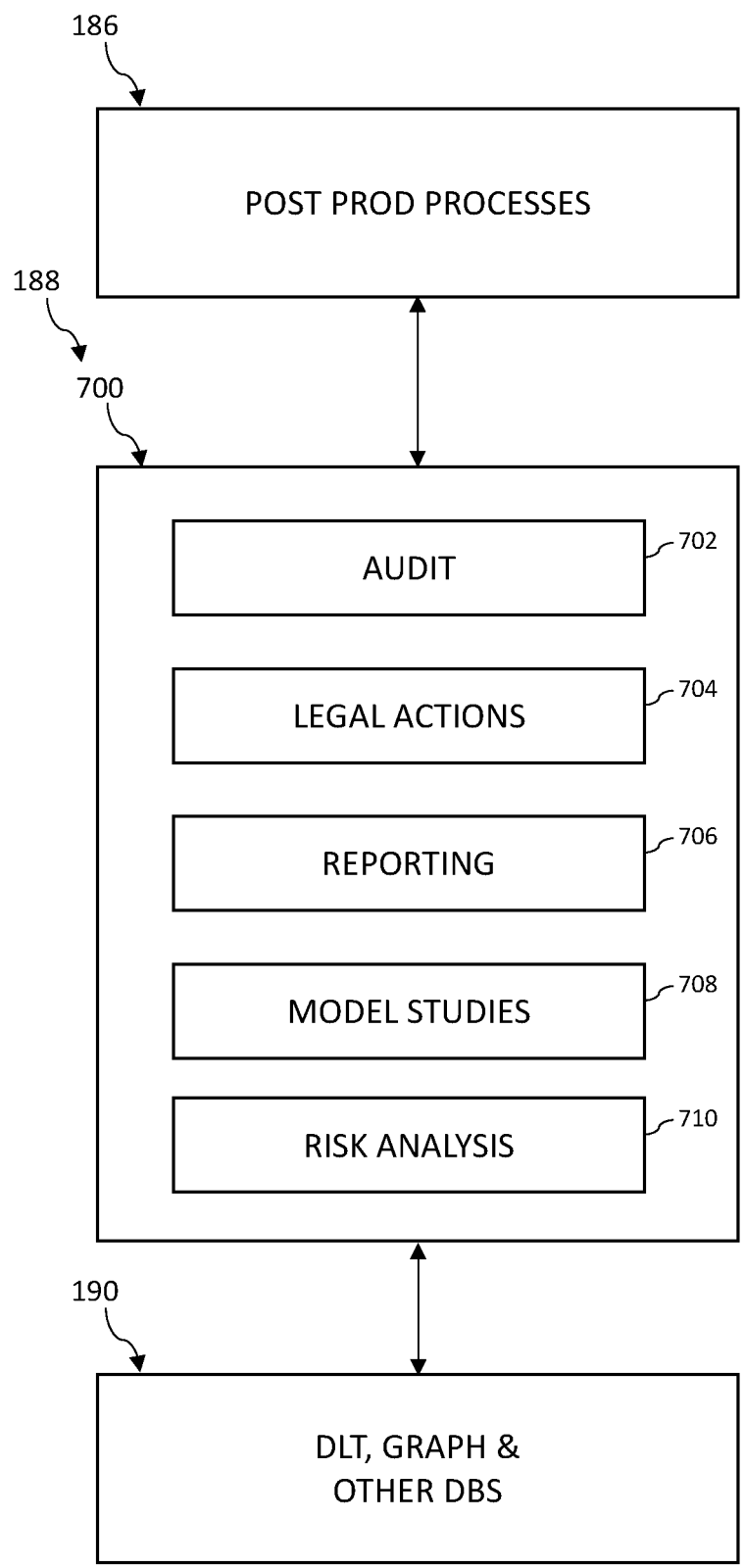
FIG. 7 illustrates a block diagram of subprocesses of a post prod process module, in accordance with various embodiments.

In various embodiments with renewed reference to FIG. 1C and with additional reference to FIG. 7 a block diagram of subprocesses 700 of a post prod process module 186 reporting activities 188 is illustrated. Post prod process 186 invokes a series of methods in reporting activities 188, which further describes the postproduction subprocesses described in 700. Process 700 describes, but is not limited to, Audit 702 resources, Legal Actions 704 support, entity Reporting 706 capabilities, methods for Model Studies 708, and AI/ML Risk Analysis 710 methods by the entity.

Audit 702 provides AI/ML model, algorithmic and data related audit capabilities as an essential process for legal, regulatory, compliance, enforcement, and other requirements for entities. In various embodiments, the system capabilities for Audit 702 supports auditor activities that require a scoping, mapping, artifact collection, review process and risk analysis, reporting and mitigation design process. Additionally, in various embodiments, Audit 702 includes audit processes for assessing algorithmic capabilities designed to optimize the efficient allocation of resources for goods and services, thereby further assessing trust of AI/ML model outcomes as implemented. In various embodiments, Audit 702 provides the system capabilities to review model, design history and architecture accountabilities for algorithm(s) selection, development, and deployment. With respect to data, selection, reduction, harmonization, and other data engineering methods, all are subject to audit examination. In addition, AI/ML model verification, validation methods, and hyperparameters are available for analysis and scrutiny. Additional audit methods for ethically oriented use cases, outcomes of the Social Impact Assessment 206, and others associated with specific domains required by the entity, may be performed. Lastly, AI/ML algorithmic audits are essential for the independent evaluation of model governance, assessing quality assurance outcomes, and ensuring that intended use principles, policies and entity objectives are met.

Legal Actions 704 comprises a grouping of methods serving vital functions of many legal justice systems, which may include e-discovery processes, legal holds, procedures to support civil and regulatory matters, and criminal cases. In various embodiments, the system follows an electronic discovery model capturing the processing stages of information governance, preservation (protecting information from spoliation), and collection to ensure private, sensitive, and legally protected information is handled appropriately. The information collected by the system may be used by internal or external parties. Interactions with business owners, information custodians and security teams are supported.

Reporting 706 may be configured to support governance, reporting, presentation, documentation and or statistical analysis by entities. In various embodiments, reporting data may be used by the system to generate dashboards for entities highlighting how many models are in production, where the models are running, how long the models have been in production, when the model was last validated, when the last compliance/regulatory check was performed, and if the models are performing with controls and thresholds. In various embodiments, the system may enable entity access to data and include methods to export data in industry standard file formats, such as .cvs, .tds, .hyper and or others.

AI/ML model registry/inventory management and associated Model Studies 708 support entity analysis of production for AI/ML models. Ongoing monitoring and analysis are desirable functions to understand model efficacy, ensure transparency measures, address issues of model decision drift, and review data quality. Analysis by the system facilitates how entities can ascertain if one model is performing better than previous versions, imperative for promoting models into production. Analysis of AI/ML models is notable if the model is in a high-risk domain (i.e., risk of discrimination), as identification and analysis of known and foreseeable risks is important. Lastly, business-oriented analysis on AI/ML model ROI may be performed by the system.

Risk Analysis 710 captures methods to support a risk-based approach for AI/ML systems. Risks for AI/ML models may be differentiated between use that creates (i) an unacceptable risk, (ii) a high risk, (iii) low or minimal risk. An example of high-risk AI/ML, whose use is considered unacceptable as contravening values to an entity, society and or nation-state, resulting in violation of fundamental rights. In addition, risks may include health and safety, liability considerations, analysis of human-centered biometric data types of natural persons (i.e., facial recognition), vulnerable groups such as those with disabilities, certain modalities (stand-alone, embedded), and others. In certain markets, higher risk AI/ML systems may be subject to compliance with certain mandatory requirements. Risk may be examined by the system based on a review of ex-ante conformity assessments, provided by the system as illustrated in FIG. 2A, or by performing an ex-post model outcome analysis. Specific risk calculations may be generated via the system by formula-based inputs from entities derived from their domain requirements and policy. Data for these entity risk calculations may be accessed from immutable databases, or other database sources 190.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for" or "step for". As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodically, randomly, once, more than once, or in response to a suitable request or action. Any of the information may be distributed and/or accessed via a software enabled link, wherein the link may be sent via an email, text, post, social network input, and/or any other method known in the art.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nuijten to fall outside the scope of patentable subject matter under 35 U.S.C. § 101.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, an APPLE® iOS operating system, a BLACKBERRY® company's operating system, and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

The system and method may be described herein in terms of functional block components, screen shots, optional selections, and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C#, JAVA®, JAVASCRIPT®, JAVASCRIPT® Object Notation (JSON), VBScript, Macromedia COLD FUSION, COBOL, MICROSOFT® company's Active Server Pages, assembly, PERL®, PHP, awk, PYTHON®, Visual Basic, SQL Stored Procedures, PL/SQL, any UNIX® shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT®, VBScript, or the like.

The system and method are described herein with reference to screen shots, block diagrams and flowchart illustrations of methods, apparatus, and computer program products according to various embodiments. It will be understood that each functional block of the block diagrams and the flowchart illustrations, and combinations of functional blocks in the block diagrams and flowchart illustrations, respectively, can be implemented by computer program instructions.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows, and the descriptions thereof may make reference to user WINDOWS® applications, webpages, websites, web forms, prompts, etc. Practitioners will appreciate that the illustrated steps described herein may comprise, in any number of configurations, including the use of WINDOWS® applications, webpages, web forms, popup WINDOWS® applications, prompts, and the like. It should be further appreciated that the multiple steps as illustrated and described may be combined into single webpages and/or WINDOWS® applications but have been expanded for the sake of simplicity. In other cases, steps illustrated and described as single process steps may be separated into multiple webpages and/or WINDOWS® applications but have been combined for simplicity.

In various embodiments, the software elements of the system may also be implemented using a JAVASCRIPT® run-time environment configured to execute JAVASCRIPT® code outside of a web browser. For example, the software elements of the system may also be implemented using NODE.JS® components. NODE.JS® programs may implement several modules to handle various core functionalities. For example, a package management module, such as NPM®, may be implemented as an open source library to aid in organizing the installation and management of third-party NODE.JS® programs. NODE.JS® programs may also implement a process manager, such as, for example, Parallel Multithreaded Machine ("PM2"); a resource and performance monitoring tool, such as, for example, Node Application Metrics ("appmetrics"); a library module for building user interfaces, and/or any other suitable and/or desired module.

The computers discussed herein may provide a suitable website or other internet-based graphical user interface which is accessible by users. In one embodiment, MICROSOFT® company's Internet Information Services (IIS), Transaction Server (MTS) service, and an SQL SERVER® database, are used in conjunction with MICROSOFT® operating systems, WINDOWS NT® web server software, SQL SERVER® database, and MICROSOFT® Commerce Server. Additionally, components such as ACCESS® software, SQL SERVER® database, ORACLE® software, SYBASE® software, INFORMIX® software, MYSQL® software, INTERBASE® software, etc., may be used to provide an Active Data Object (ADO) compliant database management system. In one embodiment, the APACHE® web server is used in conjunction with a LINUX® operating system, a MYSQL® database, and PERL®, PHP, Ruby, and/or PYTHON® programming languages.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include client data; merchant data; financial institution data; and/or like data useful in the operation of the system. As those skilled in the art will appreciate, user computer may include an operating system (e.g., WINDOWS®, UNIX®, LINUX®, SOLARIS®, MACOS®, etc.) as well as various conventional support software and drivers typically associated with computers.

The present system or any part(s) or function(s) thereof may be implemented using hardware, software, or a combination thereof and may be implemented in one or more computer systems or other processing systems. However, the manipulations performed by embodiments may be referred to in terms, such as matching or selecting, which are commonly associated with mental operations performed by a human operator. No such capability of a human operator is necessary, or desirable, in most cases, in any of the operations described herein. Rather, the operations may be machine operations or any of the operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI include mathematics, logic, philosophy, probability, linguistics, neuroscience, and decision theory. Many fields fall under the umbrella of AI, such as computer vision, robotics, machine learning, and natural language processing. Useful machines for performing the various embodiments include general purpose digital computers or similar devices.

In various embodiments, the embodiments are directed toward one or more computer systems capable of carrying out the functionalities described herein. The computer system includes one or more processors. The processor is connected to a communication infrastructure (e.g., a communications bus, cross-over bar, network, etc.). Various software embodiments are described in terms of this exemplary computer system. After reading this description, it will become apparent to a person skilled in the relevant art(s) how to implement various embodiments using other computer systems and/or architectures. The computer system can include a display interface that forwards graphics, text, and other data from the communication infrastructure (or from a frame buffer not shown) for display on a display unit.

The computer system also includes a main memory, such as random-access memory (RAM), and may also include a secondary memory. The secondary memory may include, for example, a hard disk drive, a solid-state drive, and/or a removable storage drive. The removable storage drive reads from and/or writes to a removable storage unit in a well-known manner. As will be appreciated, the removable storage unit includes a computer usable storage medium having stored therein computer software and/or data.

In various embodiments, secondary memory may include other similar devices for allowing computer programs or other instructions to be loaded into a computer system. Such devices may include, for example, a removable storage unit and an interface. Examples of such may include a program cartridge and cartridge interface (such as that found in video game devices), a removable memory chip (such as an erasable programmable read only memory (EPROM), programmable read only memory (PROM)) and associated socket, or other removable storage units and interfaces, which allow software and data to be transferred from the removable storage unit to a computer system.

The terms "computer program medium," "computer usable medium," and "computer readable medium" are used to generally refer to media such as removable storage drive and a hard disk installed in hard disk drive. These computer program products provide software to a computer system.

The computer system may also include a communications interface. A communications interface allows software and data to be transferred between the computer system and external devices. Examples of such a communications interface may include a modem, a network interface (such as an Ethernet card), a communications port, etc. Software and data transferred via the communications interface are in the form of signals which may be electronic, electromagnetic, optical, or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

In various embodiments, the server may include application servers (e.g., WEBSPHERE®, WEBLOGIC®, JBOSS®, POSTGRES PLUS ADVANCED SERVER®, etc.). In various embodiments, the server may include web servers (e.g., Apache, IIS, GOOGLE® Web Server, SUN JAVA® System Web Server, JAVA® Virtual Machine running on LINUX® or WINDOWS® operating systems).

A web client includes any device or software which communicates via any network, such as, for example any device or software discussed herein. The web client may include internet browsing software installed within a computing unit or system to conduct online transactions and/or communications. These computing units or systems may take the form of a computer or set of computers, although other types of computing units or systems may be used, including personal computers, laptops, notebooks, tablets, smart phones, cellular phones, personal digital assistants, servers, pooled servers, mainframe computers, distributed computing clusters, kiosks, terminals, point of sale (POS) devices or terminals, televisions, or any other device capable of receiving data over a network. The web client may include an operating system (e.g., WINDOWS®, WINDOWS MOBILE® operating systems, UNIX® operating system, LINUX® operating systems, APPLE® OS® operating systems, etc.) as well as various conventional support software and drivers typically associated with computers. The web-client may also run MICROSOFT® INTERNET EXPLORER® software, MOZILLA® FIREFOX® software, GOOGLE CHROME™ software, APPLE® SAFARI® software, or any other of the myriad software packages available for browsing the internet.

As those skilled in the art will appreciate, the web client may or may not be in direct contact with the server (e.g., application server, web server, etc., as discussed herein). For example, the web client may access the services of the server through another server and/or hardware component, which may have a direct or indirect connection to an internet server. For example, the web client may communicate with the server via a load balancer. In various embodiments, web client access is through a network or the internet through a commercially available web-browser software package. In that regard, the web client may be in a home or business environment with access to the network or the internet. The web client may implement security protocols such as Secure Sockets Layer (SSL) and Transport Layer Security (TLS). A web client may implement several application layer protocols including HTTP, HTTPS, FTP, and SFTP.

The system contemplates uses in association with web services, utility computing, pervasive and individualized computing, security and identity solutions, autonomic computing, cloud computing, commodity computing, mobility and wireless solutions, open source, biometrics, grid computing, and/or mesh computing.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT® programs, active server pages (ASP), common gateway interface scripts (CGI), extensible markup language (XML), dynamic HTML, cascading style sheets (CSS), AJAX (Asynchronous JAVASCRIPT And XML) programs, helper applications, plug-ins, and the like. A server may include a web service that receives a request from a web server, the request including a URL and an IP address (192.168.1.1). The web server retrieves the appropriate web pages and sends the data or applications for the web pages to the IP address. Web services are applications that are capable of interacting with other applications over a communication means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

The computing unit of the web client may be further equipped with an internet browser connected to the internet or an intranet using standard dial-up, cable, DSL, or any other internet protocol known in the art. Transactions originating at a web client may pass through a firewall in order to prevent unauthorized access from users of other networks. Further, additional firewalls may be deployed between the varying components of CMS to further enhance security.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, Triple DES, Blowfish, AES, MD5, HMAC, IDEA, RC6, and symmetric and asymmetric cryptosystems. The systems and methods may also incorporate SHA series cryptographic methods, elliptic curve cryptography (e.g., ECC, ECDH, ECDSA, etc.), and/or other post-quantum cryptography algorithms under development.

The firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPT"). A firewall may accommodate various tunneling protocols to facilitate secure communications, such as those used in virtual private networking. A firewall may implement a demilitarized zone ("DMZ") to facilitate communications with a public network such as the internet. A firewall may be integrated as software within an internet server or any other application server components, reside within another computing device, or take the form of a standalone hardware component.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like. Likewise, there are a number of methods available for modifying data in a web page such as, for example, free text entry using a keyboard, selection of menu items, check boxes, option boxes, and the like.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improve computer performance by, for example, reducing processing times. Furthermore, the distributed computational resources improve computer performance by improving security using, for example, cryptographic protocols.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

The disclosure and claims do not describe only a particular outcome of a system for project accountability services, but the disclosure and claims include specific rules for implementing the outcome of a system for project accountability services and that render information into a specific format that is then used and applied to create the desired results of a system for project accountability services, as set forth in *McRO, Inc. v. Bandai Namco Games America Inc.* (Fed. Cir. case number 15-1080, Sep. 13, 2016). In other words, the outcome of a system for project accountability services can be performed by many different types of rules and combinations of rules, and this disclosure includes various embodiments with specific rules. While the absence of complete preemption may not guarantee that a claim is eligible, the disclosure does not sufficiently preempt the field of a system for project accountability services at all. The disclosure acts to narrow, confine, and otherwise tie down the disclosure so as not to cover the general abstract idea of just a system for project accountability services. Significantly, other systems and methods exist for a system for project accountability services, so it would be inappropriate to assert that the claimed invention preempts the field or monopolizes the basic tools of a system for project accountability services. In other words, the disclosure will not prevent others from a system for project accountability services, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility,* 2015-1763

(Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

What is claimed is:

1. A computer-based system, comprising:
   at least one processor; and
   at least one tangible, non-transitory memory configured to communicate with the at least one processor, the at least one tangible, non-transitory memory having instructions stored thereon that, in response to execution by the at least one processor, cause the at least one processor to perform operations comprising:
      receiving, by the at least one processor, one or more packets comprising code implementing a predictive algorithm;
      generating, by the at least one processor, a knowledge catalog based on one or more natural language documents comprising requirements for the code implementing the predictive algorithm, wherein the knowledge catalog comprises one or more executable software processes;
      forming, by the at least one processor, an Ontology Taxonomy with Symbolic Reasoning (OTSR) structure using the knowledge catalog, wherein the OTSR structure comprises a graph database organized in a hierarchy generated from the knowledge catalogue;
      comparing, by the at least one processor, the code implementing the predictive algorithm with the OTSR structure;
      linking, by the at least one processor and based on the comparison, at least one portion of the code implementing the predictive algorithm with at least one portion of the OTSR structure;
      generating, by the at least one processor, indications of fulfilled requirements for the code implementing the predictive algorithm, and unfulfilled requirements for the code implementing the predictive algorithm, wherein the fulfilled requirements and the unfulfilled requirements are specified in the one or more natural language documents; and
      inserting, by the at least one processor, one or more metadata tags into the code implementing the predictive algorithm, wherein each metadata tag of the one or more metadata tags corresponds with a respective fulfilled requirement for the code implementing the predictive algorithm.

2. The system of claim 1, wherein the operations further comprise:
   verifying, by the at least one processor and via an active directory, a project member status;
   calculating, by the at least one processor and via a cryptographic key manager, a digital signature including a private asymmetric key based on the project member status;
   receiving, by the at least one processor, a request to preserve a project;
   initiating, by the at least one processor, an attestation process; and
   generating, by the at least one processor, a first evidence block and a second evidence block associated with an evidence record.

3. The system of claim 2, wherein the operations further comprise:
   capturing, by the at least one processor and via a project schema, a project member information comprising at least one of a name, a title, a role, an employee status, an organization, an email address, a phone number, a supervisor name, or a contribution;
   capturing, by the at least one processor and via the first evidence block, at least one of a design criteria, a development document, a design document, a development assumption, a risk assessment document, an optimization criteria, a model parameter, a decision support method, a model objective function, an influence and relevance diagram, or a first user defined custom field; and
   capturing, by the at least one processor and via the second evidence block, at least one of a code base, a model snapshot, a production snapshot, a training datum, a datum associated with a quality assurance process, a test datum, a datum associated with a verification and validation process, a data availability, a data definition, or a second user defined custom field.

4. The system of claim 3, wherein the operations further comprise:
   receiving, by the at least one processor and from a user, the code implementing the predictive algorithm and the one or more natural language documents comprising the requirements for the code implementing the predictive algorithm;
   performing, by the at least one processor, a Merkle root calculation of the project member information, the first evidence block, and the second evidence block;
   calling, by the at least one processor, a secure timestamp agent to generate a secure timestamp;
   hashing, by the at least one processor, the secure timestamp with the project member information to generate a project member hash record;
   signing, by the at least one processor, the project member hash record with the private asymmetric key to generate an attested project member evidence record based on the Merkle root calculation;
   recalling, by the at least one processor, a stored Merkle root calculation for the attested project member evidence record;
   comparing, by the at least one processor, the Merkle root calculation with the stored Merkle root calculation to determine a match;
   combining, by the at least one processor, a plurality of attested project member evidence records;
   signing, by the at least one processor, the plurality of attested project member evidence records with a system key to generate the evidence record; and
   storing, by the at least one processor, the evidence record via an immutable database.

5. The system of claim 1, wherein each higher level node in the graph database contains data describing a knowledge-based ontology in the knowledge catalog and each lower level node underneath the higher level node in the graph database contains data describing a taxonomy of the knowledge-based ontology.

6. The system of claim 1, wherein the operations further comprise one or more of:
tracking progress towards completion of requirements for the code implementing the predictive algorithm using the one or more metadata tags; and
generating a report comprising the at least one (a) a summary of the comparing of the code implementing the predictive algorithm and the OTSR structure or (b) the indications of the unfulfilled requirements for the code implementing the predictive algorithm.

7. The system of claim 1, wherein the operations further comprise:
receiving, by the at least one processor, one or more updates to the code implementing the predictive algorithm; and
updating, changing, or removing, by the at least one processor, at least one of the one or more metadata tags in the code implementing the predictive algorithm, in response to the receiving the one or more updates.

8. A method comprising:
receiving, by a computer-based system, one or more packets comprising code implementing a predictive algorithm;
generating, by the computer-based system, a knowledge catalog based on one or more natural language documents comprising requirements for the code implementing the predictive algorithm, wherein the knowledge catalog comprises one or more executable software processes;
forming, by the computer-based system, an Ontology Taxonomy with Symbolic Reasoning (OTSR) structure using the knowledge catalog, wherein the OTSR structure comprises a graph database organized in a hierarchy generated from the knowledge catalogue;
comparing, by the computer-based system, the code implementing the predictive algorithm with the OTSR structure;
linking, by the computer-based system and based on the comparison, at least one portion of the code implementing the predictive algorithm with at least one portion of the OTSR structure;
generating, by the computer based system, indications of fulfilled requirements for the code implementing the predictive algorithm, and unfulfilled requirements for the code implementing the predictive algorithm, wherein the fulfilled requirements and the unfulfilled requirements are specified in the one or more natural language documents; and
inserting, by the computer based system, one or more metadata tags into the code implementing the predictive algorithm, wherein each metadata tag of the one or more metadata tags corresponds with a respective fulfilled requirement for the code implementing the predictive algorithm.

9. The method of claim 8, further comprising:
verifying, by the computer-based system and via an active directory, a project member status;
calculating, by the computer-based system and via a cryptographic key manager, a digital signature including a private asymmetric key based on the project member status;
receiving, by the computer-based system, a request to preserve a project;
initiating, by the computer-based system, an attestation process; and
generating, by the computer-based system, a first evidence block and a second evidence block associated with an evidence record.

10. The method of claim 9, further comprising:
capturing, by the computer-based system and via a project schema, a project member information comprising at least one of a name, a title, a role, an employee status, an organization, an email address, a phone number, a supervisor name, and a contribution;
capturing, by the computer-based system and via the first evidence block, at least one of a design criteria, a development document, a design document, a development assumption, a risk assessment document, an optimization criteria, a model parameter, a decision support method, a model objective function, an influence and relevance diagram, or a first user defined custom field; and
capturing, by the computer-based system and via the second evidence block, at least one of a code base, a model snapshot, a production snapshot, a training datum, a datum associated with a quality assurance process, a test datum, a datum associated with a verification and validation process, a data availability, a data definition, or a second user defined custom field.

11. The method of claim 10, further comprising:
receiving, by the computer-based system and from a user, the code implementing the predictive algorithm and the one or more natural language documents comprising the requirements for the code implementing the predictive algorithm;
performing, by the computer-based system, a Merkle root calculation of the project member information, the first evidence block, and the second evidence block;
calling, by the computer-based system, a secure timestamp agent to generate a secure timestamp;
hashing, by the computer-based system, the secure timestamp with the project member information to generate a project member hash record;
signing, by the computer-based system, the project member hash record with the private asymmetric key to generate an attested project member evidence record based on the Merkle root calculation;
recalling, by the computer-based system, a stored Merkle root calculation for the attested project member evidence record;
comparing, by the computer-based system, the Merkle root calculation with the stored Merkle root calculation to determine a match;
combining, by the computer-based system, a plurality of attested project member evidence records;
signing, by the computer-based system, the plurality of attested project member evidence records with a system key to generate the evidence record; and
storing, by the computer-based system, the evidence record via an immutable database.

12. The method of claim 8, wherein each higher level node in the graph database contains data describing a knowledge-based ontology in the knowledge catalog and each lower level node underneath the higher level node in the graph database contains data describing a taxonomy of the knowledge-based ontology.

13. The method of claim 8, a further comprising one or more of:
tracking progress towards completion of requirements for the code implementing the predictive algorithm using the one or more metadata tags; and generating a report comprising the at least one (a) a summary of the comparing of the code implementing the predictive algorithm and the OTSR structure or (b) the indications of the unfulfilled requirements for the code implementing the predictive algorithm.

14. The method of claim 8, further comprising:
receiving, by the computer based system, one or more updates to the code implementing the predictive algorithm; and
updating, changing, or removing, by the computer based system, at least one of the one or more metadata tags in the code implementing the predictive algorithm, in response to the receiving the one or more updates.

15. An article of manufacture including at least one non-transitory, tangible computer readable storage medium having instructions stored thereon that, in response to execution by at least one processor, cause the at least one processor to perform operations comprising:
receiving, by the at least one processor, one or more packets comprising code implementing a predictive algorithm;
generating, by the at least one processor, a knowledge catalog based on one or more natural language documents comprising requirements for the code implementing the predictive algorithm, wherein the knowledge catalog comprises one or more executable software processes;
forming, by the at least one processor, an Ontology Taxonomy with Symbolic Reasoning (OTSR) structure using the knowledge catalog, wherein the OTSR structure comprises a graph database organized in a hierarchy generated from the knowledge catalogue;
comparing, by the at least one processor, the code implementing the predictive algorithm with the OTSR structure;
linking, by the at least one processor and based on the comparison, at least one portion of the code implementing the predictive algorithm with at least one portion of the OTSR structure;
generating, by the at least one processor, indications of fulfilled requirements for the code implementing the predictive algorithm, and unfulfilled requirements for the code implementing the predictive algorithm, wherein the fulfilled requirements and the unfulfilled requirements are specified in the one or more natural language documents; and
inserting, by the at least one processor, one or more metadata tags into the code implementing the predictive algorithm, wherein each metadata tag of the one or more metadata tags corresponds with a respective fulfilled requirement for the code implementing the predictive algorithm.

16. The article of manufacture of claim 15, wherein the operations further comprise:
verifying, by the at least one processor and via an active directory, a project member status;
calculating, by the at least one processor and via a cryptographic key manager, a digital signature including a private asymmetric key based on the project member status;
receiving, by the at least one processor, a request to preserve a project;
initiating, by the at least one processor, an attestation process; and
generating, by the at least one processor, a first evidence block and a second evidence block associated with an evidence record.

17. The article of manufacture of claim 16, wherein the operations further comprise:
capturing, by the at least one processor and via a project schema, a project member information comprising at least one of a name, a title, a role, an employee status, an organization, an email address, a phone number, a supervisor name, and a contribution;
capturing, by the at least one processor and via the first evidence block, at least one of a design criteria, a development document, a design document, a development assumption, a risk assessment document, an optimization criteria, a model parameter, a decision support method, a model objective function, an influence and relevance diagram, or a first user defined custom field; and
capturing, by the at least one processor and via the second evidence block, at least one of a code base, a model snapshot, a production snapshot, a training data, a datum associated with a quality assurance process, a test datum, a datum associated with a verification and validation process, a data availability, a data definition, or a second user defined custom field.

18. The article of manufacture of claim 17, wherein the operations further comprise:
receiving, by the at least one processor and from a user, the code implementing the predictive algorithm and the one or more natural language documents comprising the requirements for the code implementing the predictive algorithm;
performing, by the at least one processor, a Merkle root calculation of the project member information, the first evidence block, and the second evidence block;
calling, by the at least one processor, a secure timestamp agent to generate a secure timestamp;
hashing, by the at least one processor, the secure timestamp with the project member information to generate a project member hash record;
signing, by the at least one processor, the project member hash record with the private asymmetric key to generate an attested project member evidence record based on the Merkle root calculation;
recalling, by the at least one processor, a stored Merkle root calculation for the attested project member evidence record;
comparing, by the at least one processor, the Merkle root calculation with the stored Merkle root calculation to determine a match;
combining, by the at least one processor, a plurality of attested project member evidence records;
signing, by the at least one processor, the plurality of attested project member evidence records with a system key to generate the evidence record; and
storing, by the at least one processor, the evidence record via an immutable database.

19. The article of manufacture of claim 15, wherein each higher level node in the graph database contains data describing a knowledge-based ontology in the knowledge catalog and each lower level node underneath the higher level node in the graph database contains data describing a taxonomy of the knowledge-based ontology.

20. The article of manufacture of claim 15, wherein the operations further comprise:
receiving, by the at least one processor, one or more updates to the code implementing the predictive algorithm; and updating, changing, or removing, by the at least one processor, at least one of the one or more metadata tags in the code implementing the predictive algorithm, in response to the receiving the one or more updates.

* * * * *